US012696343B2

(12) United States Patent
Ashraf et al.

(10) Patent No.: US 12,696,343 B2
(45) Date of Patent: Jul. 28, 2026

(54) DRX OPERATION FOR D2D COMMUNICATION

(71) Applicant: Telefonaktiebolaget LM Ericsson (publ), Stockholm (SE)

(72) Inventors: Shehzad Ali Ashraf, Aachen (DE); Zhang Zhang, Beijing (CN); Antonino Orsino, Kirkkonummi (FI); Hieu Do, Järfälla (SE); Ricardo Blasco Serrano, Espoo (FI); Congchi Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 643 days.

(21) Appl. No.: 18/016,368

(22) PCT Filed: Jul. 29, 2021

(86) PCT No.: PCT/EP2021/071265
§ 371 (c)(1),
(2) Date: Jan. 16, 2023

(87) PCT Pub. No.: WO2022/023472
PCT Pub. Date: Feb. 3, 2022

(65) Prior Publication Data
US 2024/0015838 A1 Jan. 11, 2024

(30) Foreign Application Priority Data
Jul. 31, 2020 (WO) ................ PCT/CN2020/106264

(51) Int. Cl.
*H04W 76/28* (2018.01)
*H04W 92/18* (2009.01)
(52) U.S. Cl.
CPC ............ *H04W 76/28* (2018.02); *H04W 92/18* (2013.01)

(58) Field of Classification Search
CPC ......... H04W 4/46; H04W 4/70; H04W 76/14; H04W 76/23; H04W 76/28; H04W 92/18;
(Continued)

(56) References Cited

U.S. PATENT DOCUMENTS

2019/0053322 A1    2/2019  Wu et al.
2020/0245395 A1    7/2020  Zhang et al.
(Continued)

FOREIGN PATENT DOCUMENTS

CN        106256163 A    12/2016
CN        110089058 A     8/2019
(Continued)

OTHER PUBLICATIONS

Kim, Jae Heung, "Method and Apparatus for Low-Power-Consumption Operation for a Terminal Supporting Direct Communication Function," Korean App. No. 10-2020-0087687, published with US Pre-Grant Publication App. No. 2022/0022279, pp. 65-46—65-49, and 65-64 (Year: 2022).*
(Continued)

*Primary Examiner* — Thomas R Cairns
(74) *Attorney, Agent, or Firm* — Murphy, Bilak & Homiller, PLLC

(57) ABSTRACT

A wireless communication device (UE1) determines a DRX configuration for D2D communication. The DRX configuration is based on at least one timer maintained by the wireless communication device (UE1). Further, the wireless communication device (UE1) controls the at least one timer based on at least one D2D transmission between the wireless communication device (UE1) and a further wireless communication device (UE2). Based on the DRX configuration, the wireless communication device (UE1) receives at least one D2D transmission (405) from the further wireless communication device (UE2).

16 Claims, 17 Drawing Sheets

(58) Field of Classification Search
CPC ............. H04W 4/40–48; H04W 8/005; H04W 36/0083; H04W 52/02; H04W 84/18; H04W 88/04; Y02D 30/70
See application file for complete search history.

(56) References Cited

U.S. PATENT DOCUMENTS

| | | | |
|---|---|---|---|
| 2022/0022279 A1* | 1/2022 | Kim ...................... | H04W 72/23 |
| 2023/0014303 A1* | 1/2023 | Di Girolamo ........ | H04W 72/20 |
| 2023/0064488 A1* | 3/2023 | Han ...................... | H04W 76/28 |
| 2023/0180343 A1* | 6/2023 | Park ...................... | H04W 76/14 |

FOREIGN PATENT DOCUMENTS

| | | |
|---|---|---|
| EP | 4094539 A1 | 11/2022 |
| GB | 2555662 A | 5/2018 |
| WO | 2017078783 A1 | 5/2017 |
| WO | 2020096436 A1 | 5/2020 |
| WO | 2021147011 A1 | 7/2021 |

OTHER PUBLICATIONS

Kim, Jae Heung, "Method and Apparatus for Low-Power-Consumption Operation for a Terminal Supporting Direct Communication Function," Korean App. No. 10-2020-0090517, published with US Pre-Grant Publication App. No. 2022/0022279, pp. 70-46—70-49, and 70-68 (Year: 2022).*

Kim, Jae Heung, "Method and Apparatus for Low-Power-Consumption Operation for a Terminal Supporting Direct Communication Function," partial translation of Korean App. No. 10-2020-0087687, pp. 1-4 (Year: 2026).*

Kim, Jae Heung, "Method and Apparatus for Low-Power-Consumption Operation for a Terminal Supporting Direct Communication Function," partial translation of Korean App. No. 10-2020-0090517, pp. 1-3 (Year: 2026).*

"3GPP TS 38.321 V16.0.0", 3rd Generation Partnership Project; Technical Specification Group Radio Access Network; NR; Medium Access Control (MAC) protocol specification (Release 16), Mar. 2020, pp. 1-141.

"Discussion on Rel-16 SG V2X WI leftovers for Rel-17 NR sidelink enhancement WI", 3GPP TSG RAN Meeting #88e, RP-200857, Electronic Meeting, Jun. 29-Jul. 3, 2020, pp. 1-6.

"Discussion on Sidelink DRX", 3GPP TSG-RAN WG2 Meeting #112 electronic, R2-2008943, Online, Nov. 2-Nov. 13, 2020, pp. 1-6.

"Sidelink maintenance for evolved L2 relay", 3GPP TSG-RAN WG2#98, R2-1705126, Hangzhou, China, May 15-19, 2017, pp. 1-4.

"3GPP TS 38.321 V15.8.0", 3rd Generation Partnership Project; Technical Specification Group Radio Access Network; NR; Medium Access Control (MAC) protocol specification (Release 15), Dec. 2019, pp. 1-78.

"3GPP TR 38.885 V16.0.0", 3rd Generation Partnership Project; Technical Specification Group Radio Access Network; NR; Study on NR Vehicle-to-Everything (V2X) (Release 16), Mar. 2019, pp. 1-122.

"DRX for sidelink communications", 3GPP TSG-RAN WG2 Meeting #112-e, R2-2009231, e-Meeting, Nov. 2-13, 2020, pp. 1-6.

"New WID on NR sidelink enhancement", 3GPP TSG RAN Meeting #86, RP-193231, (revision of RP-193134), Sitges, Spain, Dec. 9-12, 2019, pp. 1-6.

* cited by examiner

1210 — Determine DRX configuration for D2D communication

1220 — Align DRX configuration

1230 — Control DRX timer(s) based on D2D transmission(s)

1240 — Receive D2D transmission(s)

1410 — Determine DRX configuration for D2D communication

1420 — Align DRX configuration

1430 — Participate in D2D communication

1610 — Control wireless communication devices

1620 — Receive/send control information

1630 — Align DRX configurations

1710 — Module 1:
Controlling
wireless communication devices

1720 — Module 2:
Receiving/sending control information

1730 — Module 3:
Aligning DRX configuration

1700

NETWORK NODE

DRX OPERATION FOR D2D COMMUNICATION

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink (SL) communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019 March). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

Further potential use cases of D2D communication include NSPS (National Security and Public Safety), Network Controlled Interactive Service (NCIS), and Gap Analysis for Railways. In order to provide a wider coverage of NR sidelink for such use cases, it further enhancements of the NR sidelink technology are being considered. One of such enhancements is power saving which enables UEs with battery constraint to perform sidelink operations in a power efficient manner. For example, 3GPP work item description "NR Sidelink Enhancement", document RP-193231, TSG RAN Meeting #86 (2019 December), suggests investigation of sidelink Discontinuous Reception (DRX) operation for broadcast, groupcast, and unicast transmission modes, aiming at definition of sidelink DRX configurations and procedures for implementing sidelink DRX in UEs, including mechanisms to align sidelink DRX configurations among the UEs communicating with each other, and mechanisms to align sidelink DRX configurations with DRX configurations for downlink (DL) and uplink (UL) communication via the Uu radio interface. However, appropriate mechanisms and procedures have not yet been developed.

For the NR technology, DRX procedures for DL/UL communication via the Uu radio interface are specified in 3GPP TS 38.321 V16.0.0 (2020 March). On the basis of these procedures, expected UE behavior in terms of reception and processing of transmissions can be controlled. The underlying DRX functionalities are based on defining a DRX active time, sometimes also referred to as active time state or ACTIVE state, in which the UE is expected to receive and process incoming transmissions. For example, the UE is expected to decode the DL control channels, process received grants etc. Outside the DRX active time, in what is also denoted as DRX inactive time, there is no expectation on the UE to receive and process transmissions. Accordingly, an access node, in the NR technology denoted as "gNB", cannot assume that the UE will be listening to DL transmissions. A DRX configuration may also define transitions between states. Typically, UEs that are not in the DRX active time turn off some of their components and enter a low-power mode, e.g., a sleeping mode. To ensure that the UE regularly switches to the DRX active time, i.e., wakes up from the sleeping mode, a DRX cycle is defined. The DRX cycle may basically be based on two parameters: a periodicity of the DRX cycle, which controls how frequently the UE switches to the DRX active time, and a duration of the DRX active time, which controls for how long the UE is in the DRX active state. In addition to this basic DRX cycle, the DRX procedures also define other conditions that may allow the UE to switch between the DRX active time and the DRX inactive time. For example, if a UE is expecting a retransmission from the gNB, the UE may enter the DRX inactive time, e.g., while the gNB prepares the retransmission, and then may enter the DRX active time, which should match a time window in which the gNB is expected to send the retransmission. Typically, the DRX active time of the DRX cycle is determined by the DRX configuration. Accordingly, the DRX configuration typically allows to predict when the UE will be in the DRX active time. On the other hand, it might be much more difficult to predict whether a UE is in the DRX active time due various timers which depend on the data traffic received or sent by the UE. The DRX procedures specified in 3GPP TS 38.321 V16.0.0 apply to the DL/UL communication between the UE and the wireless communication network, and cannot be applied to SL communication or other types of D2D communication.

Accordingly, there is a need for techniques which allow for efficiently implementing DRX for sidelink transmissions and other types of D2D transmission.

SUMMARY

According to an embodiment, a method of controlling D2D communication is provided. According to the method, a wireless communication device determines a DRX configuration for D2D communication. Further, the wireless communication device aligns the DRX configuration with a further wireless communication device. Based on the DRX configuration, the wireless communication device partici-
pates in D2D communication with the further wireless
communication device.

According to a further embodiment, a method of control-
ling D2D communication is provided. According to the
method, a node of a wireless communication network aligns
a first wireless communication device and a second wireless
communication device with respect to a DRX configuration
for D2D communication between the first wireless commu-
nication device and the second wireless communication
device.

According to a further embodiment, a method of control-
ling D2D communication is provided. According to the
method, a wireless communication device determines a
DRX configuration for D2D communication. The DRX
configuration is based on at least one timer maintained by
the wireless communication device. Further, the wireless
communication device controls the at least one timer based
on at least one D2D transmission between the wireless
communication device and a further wireless communica-
tion device. Based on the DRX configuration, the wireless
communication device receives at least one D2D transmis-
sion from the further wireless communication device.

According to a further embodiment, a wireless commu-
nication device is provided. The wireless communication
device is configured to determine a DRX configuration for
D2D communication. Further, the wireless communication
device is configured to align the DRX configuration with a
further wireless communication device. Further, the wireless
communication device is configured to, based on the DRX
configuration, participate in D2D communication with the
further wireless communication device.

According to a further embodiment, a wireless commu-
nication device is provided. The wireless communication
device comprises at least one processor and a memory. The
memory contains instructions executable by said at least one
processor, whereby the wireless communication device is
operative to determine a DRX configuration for D2D com-
munication. Further, the memory contains instructions
executable by said at least one processor, whereby the
wireless communication device is operative to align the
DRX configuration with a further wireless communication
device. Further, the memory contains instructions execut-
able by said at least one processor, whereby the wireless
communication device is operative to, based on the DRX
configuration, participate in D2D communication with the
further wireless communication device.

According to a further embodiment, a node for a wireless
communication network is provided. The node is configured
to align a first wireless communication device and a second
wireless communication device with respect to a DRX
configuration for D2D communication between the first
wireless communication device and the second wireless
communication device.

According to a further embodiment, a node for a wireless
communication network is provided. The node comprises at
least one processor and a memory. The memory contains
instructions executable by said at least one processor,
whereby the node is operative to align a first wireless
communication device and a second wireless communica-
tion device with respect to a DRX configuration for D2D
communication between the first wireless communication
device and the second wireless communication device.

According to a further embodiment, a wireless commu-
nication device is provided. The wireless communication
device is configured to determine a DRX configuration for
D2D communication. The DRX configuration is based on at least one timer maintained by the wireless communication
device. Further, the wireless communication device is con-
figured to control the at least one timer based on at least one
D2D transmission between the wireless communication
device and a further wireless communication device. Fur-
ther, the wireless communication device is configured to,
based on the DRX configuration, receive at least one D2D
transmission from the further wireless communication
device.

According to a further embodiment, a wireless commu-
nication device is provided. The wireless communication
device comprises at least one processor and a memory. The
memory contains instructions executable by said at least one
processor, whereby the wireless communication device is
operative to determine a DRX configuration for D2D com-
munication. The DRX configuration is based on at least one
timer maintained by the wireless communication device.
Further, the memory contains instructions executable by said
at least one processor, whereby the wireless communication
device is operative to control the at least one timer based on
at least one D2D transmission between the wireless com-
munication device and a further wireless communication
device. Further, the memory contains instructions execut-
able by said at least one processor, whereby the wireless
communication device is operative to, based on the DRX
configuration, receive at least one D2D transmission from
the further wireless communication device.

According to a further embodiment of the invention, a
computer program or computer program product is pro-
vided, e.g., in the form of a non-transitory storage medium,
which comprises program code to be executed by at least
one processor of a wireless communication device. Execu-
tion of the program code causes the wireless communication
device to determine a DRX configuration for D2D commu-
nication. Further, execution of the program code causes the
wireless communication device to align the DRX configu-
ration with a further wireless communication device. Fur-
ther, execution of the program code causes the wireless
communication device to, based on the DRX configuration,
participate in D2D communication with the further wireless
communication device.

According to a further embodiment of the invention, a
computer program or computer program product is pro-
vided, e.g., in the form of a non-transitory storage medium,
which comprises program code to be executed by at least
one processor of a node for a wireless communication
network. Execution of the program code causes the node to
align a first wireless communication device and a second
wireless communication device with respect to a DRX
configuration for D2D communication between the first
wireless communication device and the second wireless
communication device.

According to a further embodiment of the invention, a
computer program or computer program product is pro-
vided, e.g., in the form of a non-transitory storage medium,
which comprises program code to be executed by at least
one processor of a wireless communication device.

Execution of the program code causes the wireless com-
munication device to determine a DRX configuration for
D2D communication. The DRX configuration is based on at
least one timer maintained by the wireless communication
device. Further, execution of the program code causes the
wireless communication device to control the at least one
timer based on at least one D2D transmission between the
wireless communication device and a further wireless com-
munication device. Further, execution of the program code
causes the wireless communication device to, based on the DRX configuration, receive at least one D2D transmission from the further wireless communication device.

Details of such embodiments and further embodiments will be apparent from the following detailed description of embodiments.

DETAILED DESCRIPTION OF EMBODIMENTS

Figure 1:
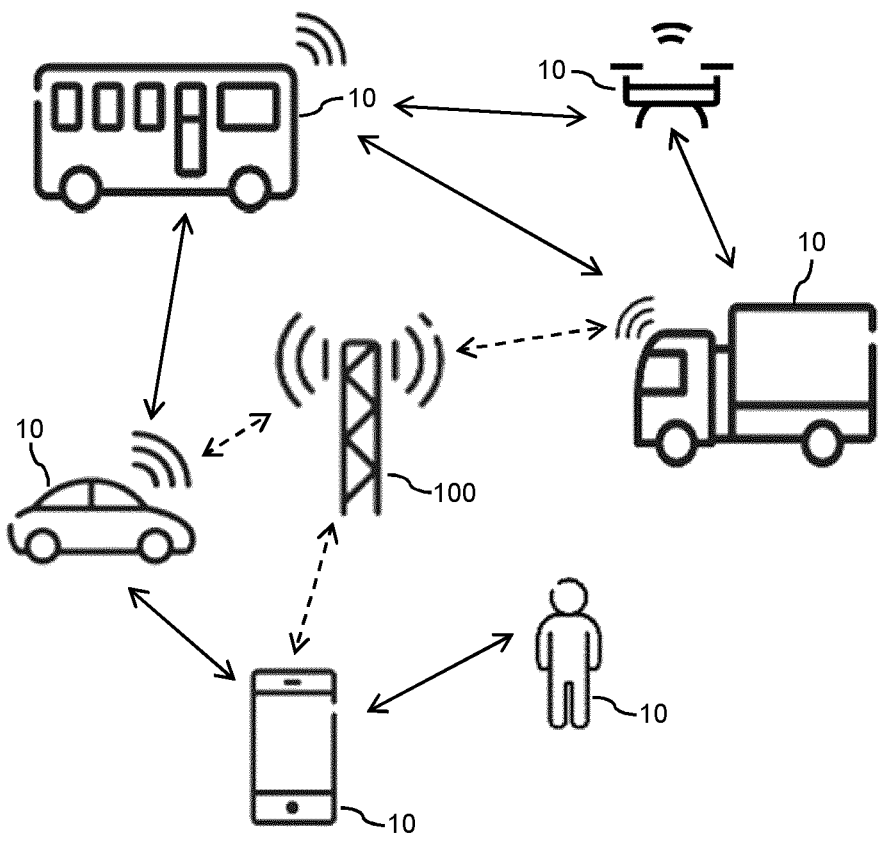
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication by wireless communication devices. These wireless communication devices may include various types of UEs or other wireless devices (WDs). As used herein, the term "wireless device" (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 interface of the LTE or NR technology. However, it is noted that the illustrated concepts could also be applied to other radio technologies, e.g., a WLAN (Wireless Local Area Network) technology.

In the illustrated concepts, D2D communication may be performed in an energy efficient manner by using procedures and mechanisms which enable DRX operation for D2D communication. The DRX operation may for example be applied to sidelink (SL) communication via the PC5 interface of the LTE or NR technology, which herein denoted by "SL DRX". The DRX operation may involve configuring a UE which participates in D2D communication with a DRX active time and a DRX inactive time. A sequence of one active time and subsequent inactive time may also be denoted as "SL DRX cycle", keeping in mind that the SL DRX cycle does not need to repeat in a periodic manner and that durations of the active time and/or of the inactive time may vary from one SL DRX cycle to the next.

In the D2D communication considered herein, the UE may act as a receiver, herein also denoted as RX UE, and/or as a transmitter, herein also denoted as TX UE. For the TX UE, participating in the D2D communication may involve that during the DRX active time, the TX UE sends at least one D2D transmission to the RX UE. For the RX UE, participating in the D2D communication may involve that during the DRX active time, the RX UE receives at least one D2D transmission from the TX UE. During the DRX inactive time, the RX UE may switch off at least a part of its receiver circuitry to enable energy saving. During the DRX active time, the RX UE is in an DRX active mode and not allowed to switch off parts of its receiver circuitry. The TX UE may consider the DRX inactive time by refraining from sending any D2D transmission to the RX UE during the DRX inactive time.

It is noted that some of the following examples are described from the perspective of an RX UE while others are described from the perspective of a TX UE, but that the roles of the RX UE and the TX UE are interchangeable. Further, a UE can at the same time act as a TX UE and as an RX UE. Further, while examples as explained below may assume that a D2D UE and its serving access node operate using the same radio access technology (RAT), e.g., the NR or LTE technology, the illustrated concepts could be applied to any combination of RATs between the D2D UE and its serving access node. Further, in the illustrated concepts a D2D transmission may be based on a unicast, groupcast, or broadcast transmission mode.

FIG. 1 illustrates an exemplary scenario involving V2X communications. In particular, FIG. 1 shows various UEs 10, which may engage in V2X communication or other D2D communication, illustrated by solid arrows. Further, FIG. 1 shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs 10 illustrated in FIG. 1 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device. The V2X communication may also involve utilizing the illustrated mechanisms and procedures to enable DRX operation for the V2X communication between the UEs 10, thereby improving energy efficiency of the V2X communication.

Figure 2:
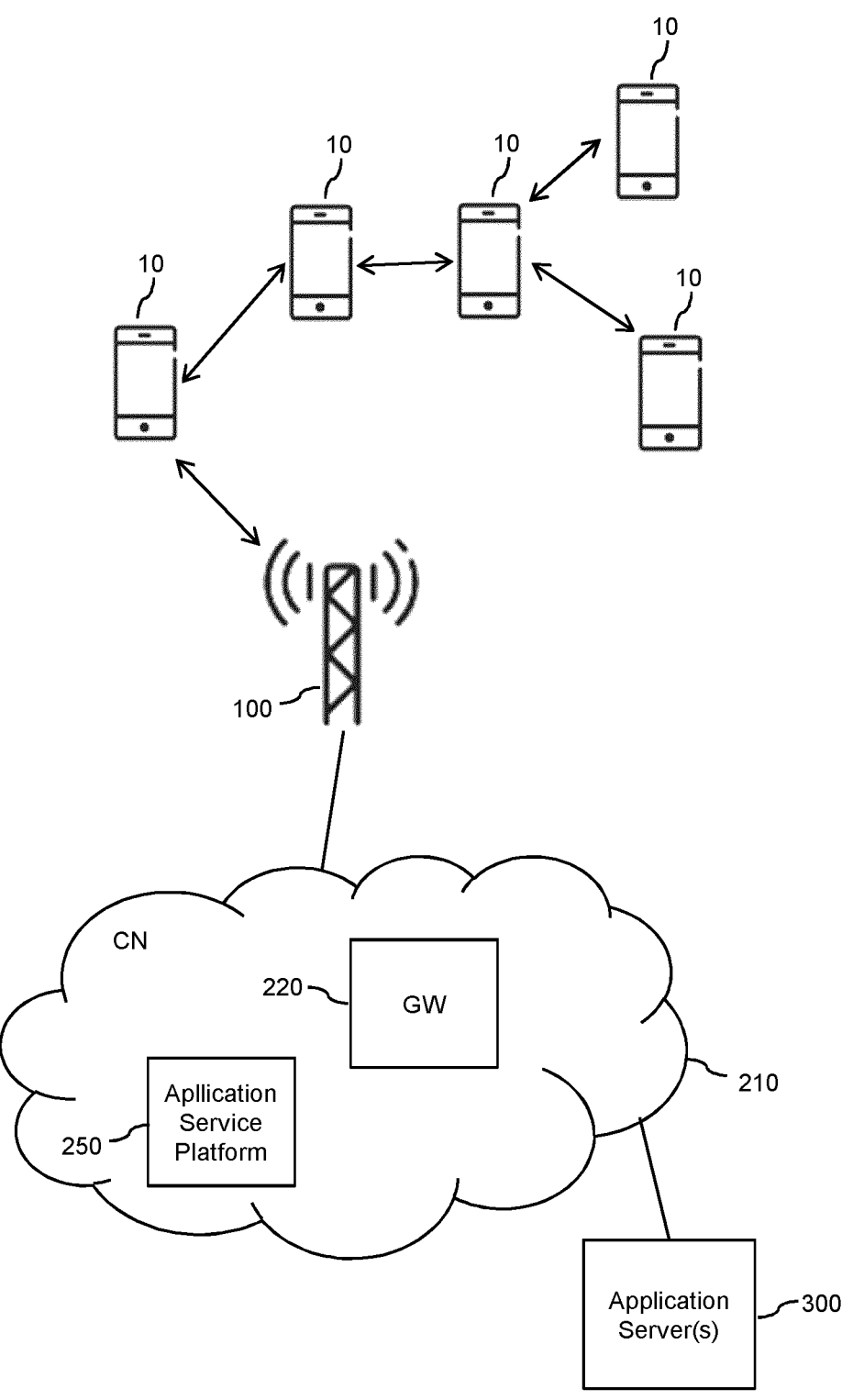
FIG. 2 schematically illustrates an exemplary scenario according to an embodiment of the invention, in which D2D communication may be controlled according to an embodiment of the invention.

FIG. 2 illustrates an exemplary D2D communication scenario. In particular, FIG. 2 shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2 shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, an NSPS service, and/or an NCIS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 2 illustrates an application service platform 250 in the CN 210 of the wireless communication network. Further, FIG. 2 illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs 10 may thus be hosted on the network side, e.g., on the application service platform 250 or on the application server(s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network. Also in the scenario of FIG. 2, the UEs 10 may apply the DRX operation to the D2D communication to improve energy efficiency.

In the example of FIG. 2, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 1.

Figure 3:
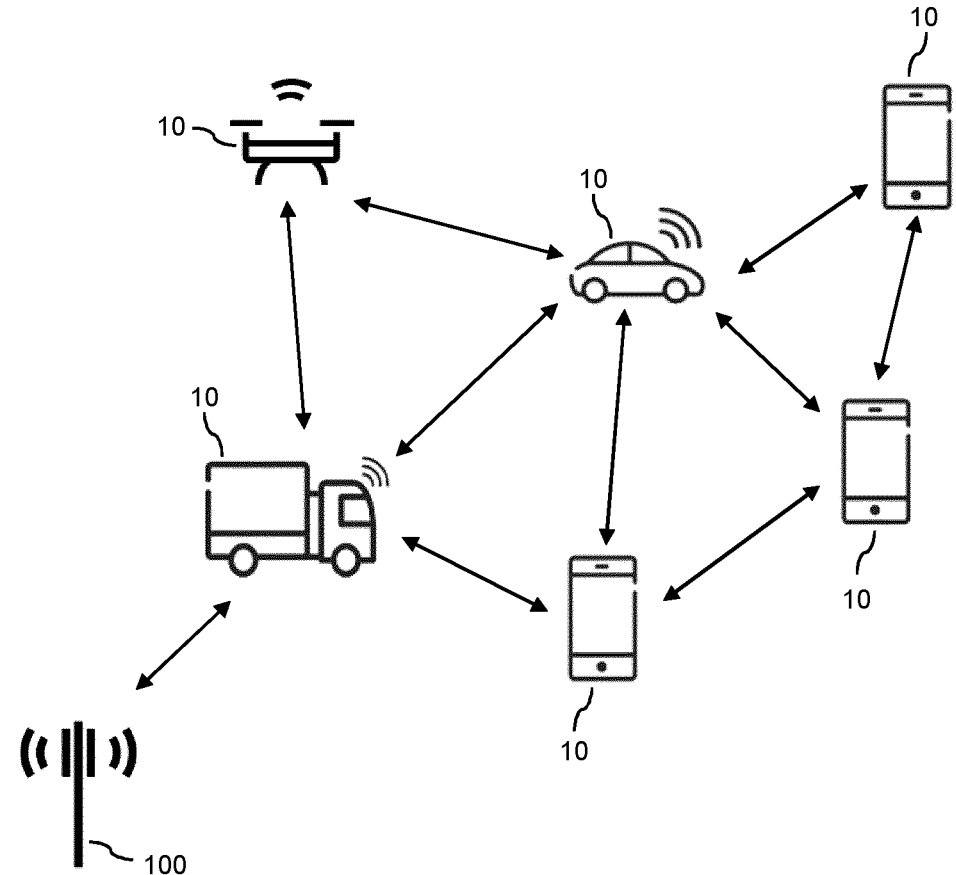
FIG. 3 schematically illustrates an exemplary NSPS communication scenario in which D2D communication may control establishment of a direct wireless link according to an embodiment of the invention.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve utilizing the illustrated mechanisms and procedures to enable DRX operation for D2D communication between the UEs 10, thereby improving energy efficiency of the D2D communication.

As mentioned above, in some scenarios the D2D communication to which the DRX operation is applied may be based on the SL mode of the NR or LTE technology, using the PC5 radio interface. In such cases the SL communication may be based on multiple physical channels defined on a physical (PHY) layer of the radio interface between the TX UE and the RX UE, including a Physical sidelink control channel (PSCCH), a Physical sidelink shared channel (PSSCH), a Physical sidelink feedback channel (PSFCH), and a Physical sidelink broadcast channel (PSBCH). The data decoded from the PHY layer may then be further processed by an MAC (Medium Access Control) entity of the RX UE.

The PSCCH carries only control information, usually referred to as the first-stage SCI (Sidelink Control Information). It is transmitted using a predefined format in predetermined radio resources, allowing a RX UE to use blind decoding. That is, a RX UE attempts to decode PSCCH according to the predefined format in the predetermined radio resources, without knowing beforehand whether a PSCCH was indeed transmitted or not. If the decoding operation succeeds, the RX UE assumes that a PSCCH was transmitted. Otherwise, it assumes no PSCCH was transmitted. The PSCCH carries information that is necessary to decode the PSSCH.

The PSSCH carries both control information and data payload. The control information is usually referred to as the second-stage SCI. It is transmitted using the radio resource allocation and transmission format indicated in PSCCH. It contains further information that is necessary to decode the data payload carried by PSSCH too.

The PSFCH carries only feedback information. The contents of PSFCH depends on the mode of HARQ operation. In some cases, both positive (also denoted as ACK) and negative (also denoted as NACK) acknowledgements are transmitted. In other cases, only NACK is transmitted. PSFCH transmission uses a predefined format and takes place in predetermined radio resources.

The PSBCH carries basic system configuration information, e.g., concerning bandwidth, TDD (time-division duplexing) configuration, or the like. Further, the PSBCH carries synchronization signals.

For the SL communication, a typical operation may be as follows: A first UE performs a SL transmission on the PSCCH and PSSCH. A second UE receives the SL transmission. Receiving the SL transmission may involve that, by means of blind decoding, the second UE detects the PSCCH and decodes the first-stage SCI carried by the PSCCH. If the blind decoding is successful, the second UE uses the decoded contents of the PSCCH to decode second-stage SCI carried by the PSSCH. Having decoded the second-stage SCI, the second UE uses the first-stage SCI and the second-stage SCI to decodes payload data carried by the PSSCH. Having successfully decoded the payload data, the second UE proceeds to transmit HARQ (Hybrid Automatic Repeat Request) feedback on the PSFCH. Different modes of providing the HARQ feedback may be utilized. The first UE expects to receive the HARQ feedback from the second UE and may use the presence and contents of the PSFCH to determine further actions, e.g., whether to perform a retransmission or not. Accordingly, the PSDCH may be is used to trigger actions related to HARQ operation for the SL transmission. The utilization of the HARQ feedback may also be omitted in some cases. For example, HARQ feedback is typically not utilized for SL transmissions in broadcast mode. The TX UE (e.g., the first UE in the considered example) may indicate in the SCI whether or not it expects the RX UE (e.g., the second UE in the considered example) to transmit the PSFCH with HARQ feedback.

The DRX operation for SL transmissions may be based on configuring, as part of a SL DRX configuration of the UE, one or more timers and parameters to control switching of the UE between the active time and the inactive time. In particular, these timers and parameters may include one or more of the following:

a timer denoted as "drx-onDurationTimerSL", which defines a duration at the beginning of a SL DRX cycle;

a parameter denoted as "drx-SlotOffsetSL", which defines a delay before starting the timer drx-onDurationTimerSL;

a parameter denoted as "drx-LongCycleStartOffsetSL", which defines a long SL DRX cycle; a parameter denoted as "drx-StartOffsetSL", which defines a subframe where the (long or short) SL DRX cycle starts;

an optional parameter denoted as "drx-ShortCycleSL", which defines a short SL DRX cycle;

an optional timer denoted as "drx-ShortCycleTimerSL" which denotes a duration for which the UE shall follow the short SL DRX cycle;

a timer denoted as "drx-InactivityTimerSL", which defines a duration after receiving the PSCCH/PSSCH occasion including SCI information which indicates a new SL transmission for the MAC entity;

a timer denoted as "drx-RetransmissionTimerSL", which defines a maximum duration until a SL retransmission is received, typically defined per SL HARQ process, except for the broadcast SL transmissions;

a timer denoted as "drx-HARQ-RTT-TimerSL", which defines a minimum duration before a SL retransmission grant on the PSCCH for SL HARQ retransmission is expected by the MAC entity, typically defined per SL HARQ process, except for the broadcast SL transmissions;

a timer denoted as "drx-HARQ-FB-TimerSL", which defines a maximum duration until an SL HARQ feedback is received, typically defined per SL HARQ process, except for the broadcast SL transmissions;

a timer denoted as "drx-HARQ-FB-RTT-TimerSL", which defines, if HARQ feedback is required for a given PSSCH transmission, a minimum duration before an SL HARQ feedback on PSFCH is expected after the associated PSSCH transmission, typically defined per SL HARQ process, except for the broadcast SL transmissions;

a timer denoted as "drx-CSIReport-TimerSL", which defines a maximum duration until an SL CSI (Channel State Information) report is received;

a timer denoted as "drx-CSIReport-RTT-TimerSL", which defines a minimum duration before an SL transmission grant on the PSCCH for CSI report is expected by the MAC entity;

a timer denoted as "drx-Retx-Proc-TimerSL", which defines a minimum duration before the next blind retransmission is expected, typically defined per SL HARQ process;

a timer denoted as "drx-BlindRetransmissionTimerSL", which defines a maximum duration until the next blind retransmission is received or, alternatively, a maximum duration until all blind retransmissions of an SL transmission are received or a maximum number of blind retransmissions for an SL transmission, typically defined per SL process.

Due to their usage in controlling SL DRX operation, the above-mentioned timers may also be referred to as "SL DRX timers". It is noted that the names of the above timers and parameters may vary, and that the SL DRX configuration may also include various additional parameters.

It is noted that concepts as illustrated herein can be used by applying all the above parameters and timers defined of the SL DRX configuration or applying only a subset of them. For example, in some cases only a subset of all the parameters or timers may be configured or enabled. For example, the SL DRX configuration may include parameters or timers related to HARQ but some of them might not be used if HARQ feedback is not utilized or disabled. Similarly, some of the parameters or timers might not be used if a maximum number of transmissions of a data packet is set to one or their usage might be limited based on a configured maximum number of retransmissions. For example, for a data packet a certain timer could be reset only K times, where K is the maximum number of transmissions for that data packet or a (pre-)configured maximum number of transmissions, e.g., (pre-)configured per SL resource pool. Similarly, some parameters or timers might not be in use if the SL transmission does not have associated SL HARQ feedback or if the grant or SL resource pool does not include resources for transmission of SL HARQ feedback.

As further explained in the following, the UEs which participate in the SL transmissions may be configured to wake-up during DRX operation, i.e., to switch to the DRX active time, considering SL transmission characteristics, such as expected HARQ feedback transmission, data (re) transmission, and/or CSI report transmissions. Accordingly, DRX timers may be controlled, i.e., started, restarted, or stopped, based on one or more SL transmissions. These SL transmissions may include SL transmissions carrying control information, e.g., in the PSCCH or PSSCH. Alternatively or in addition, these SL transmissions may include SL transmissions carrying data payload, e.g., in the PSSCH. Alternatively or in addition, these SL transmissions may include SL transmissions carrying HARQ feedback, e.g., in the PSFCH. Alternatively or in addition, these SL transmissions may include SL transmissions triggering a CSI report, e.g., by indicating it in SCI, by carrying CSI-RS, or the like.

Alternatively or in addition, these SL transmissions may include SL transmissions carrying a CSI report, e.g., including a rank indicator (RI), or a channel quality indicator (CQI), or a precoding matrix indicator (PMI), or transmissions carrying a SL pathloss estimate, e.g., to be used for power control.

The SL DRX timers include timers for which the UE is in DRX active mode while the timer is running, as well as other timers, e.g., timers controlling the time during which the UE is allowed to leave the DRX active mode. In the following examples, the UE is controlled to be in the DRX active mode when any of the following timers, which may also be denoted as "DRX active timers" is running: the timer drx-onDurationTimerSL, the timer drx-InactivityTimerSL, the timer drx-RetransmissionTimerSL, the timerdrx-HARQ-FB-TimerSL, the timer drx-CSIReport-TimerSL, and the timer drx-BlindRetransmissionTimerSL. In some scenarios, it is also possible that for the timer drx-BlindRetransmissionTimerSL, the UE does not need to stay in the DRX active mode while the timer drx-BlindRetransmissionTimerSL is running.

In some examples, after a UE receives some SCI, e.g., carried in the PSCCH or PSSCH, which indicates a SL transmission of interest, for which the UE is a targeted received, or transmits a triggering message, e.g., a message that triggers SL CSI report, which triggers a SL transmission from the another UE, the UE starts the timer drx-InactivityTimerSL. When the timer drx-InactivityTimerSL expires, the UE uses the short SL DRX cycle and starts or restarts the timer drx-ShortCycleTimerSL, if the short SL DRX Cycle is configured, otherwise it uses the long SL DRX cycle. In other examples, if the data of the corresponding HARQ process was successfully decoded, the UE stops all DRX active timers, e.g. the timer drx-onDurationTimerSL, the timer drx-InactivityTimerSL, the timer drx-RetransmissionTimerSL, and, optionally, the timer drx-BlindRetransmissionTimerSL.

In some scenarios, the illustrated concepts may be used for enabling DRX operation for HARQ feedback-based retransmissions. In such scenarios, if some SCI, e.g., carried in the PSCCH or PSSCH, indicates that HARQ feedback is required for the associated PSSCH transmission, the UE starts the timer drx-HARQ-RTT-TimerSL in the first symbol after the end of the corresponding transmission carrying the SL HARQ feedback. In addition, for the corresponding SL HARQ process, the UE stops the timer drx-RetransmissionTimerSL. If the timer drx-HARQ-RTT-TimerSL expires and the data of the corresponding SL HARQ process was not successfully decoded, the UE starts the timer drx-RetransmissionTimerSL for the corresponding SL HARQ process. While the timer drx-RetransmissionTimerSL is running, the UE remains in the DRX active mode. If UE decodes the retransmission for the corresponding SL HARQ process while the associated DRX active timer is running, e.g., while the timer drx-RetransmissionTimerSL is running, the UE may stop this DRX active timer.

Figure 4:
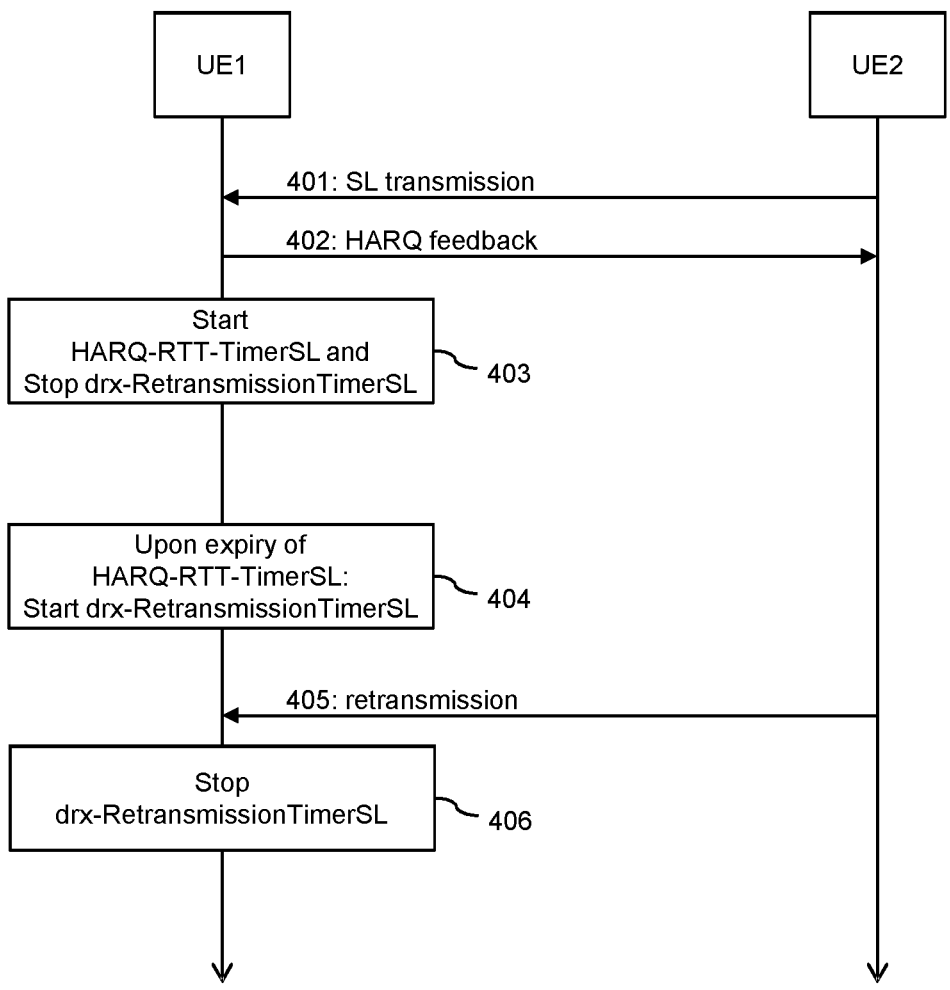
FIG. 4 schematically illustrates an exemplary scenario in which DRX operation for a D2D transmission is controlled according to an embodiment of the invention.

FIG. 4 shows an example of procedures enabling DRX operation for HARQ feedback-based retransmissions. The procedures of FIG. 4 involve a first UE (UE1) and a second UE (UE2). In the example of FIG. 4, UE1 receives an SL transmission 401, e.g., carrying a MAC PDU (Protocol Data Unit), which requires HARQ feedback. The requirement of HARQ feedback may be indicated by SCI related to the SL transmission 401. As further illustrated, UE1 sends the HARQ feedback 402 to UE2. As illustrated by block 403, UE1 then starts the timer drx-HARQ-RTT-TimerSL for the corresponding HARQ process and stops the timer drx- RetransmissionTimerSL for the corresponding HARQ process. This may be accomplished in the first symbol after the end of the corresponding SL transmission carrying the SL HARQ feedback 402. As illustrated by block 404, when the timer drx-HARQ-RTT-TimerSL expires and the data of the corresponding HARQ process was not successfully decoded, UE1 starts the timer drx-RetransmissionTimerSL for the corresponding HARQ process. This may be accomplished in the first symbol after the expiry of drx-HARQ-RTT-TimerSL. During the subsequent DRX active time, UE1 receives the HARQ feedback-based retransmission 405 from UE2. As illustrated by block 406, upon successfully decoding the data from the corresponding HARQ process, e.g., based on the initial SL transmission 401 and the retransmission 405, UE1 stops the timer drx-RetransmissionTimerSL, which may allow UE1 to leave the DRX active mode.

In some scenarios, the illustrated concepts may be used for enabling DRX operation for transmissions of HARQ feedback. In such scenarios, a UE may transmit some SCI, e.g., carried in PSCCH or PSSCH, indicating that HARQ feedback is required for the associated PSSCH transmission, and the UE expects to receive HARQ feedback from the peer UE. The UE may then start the timer drx-HARQ-FB-RTT-TimerSL for the corresponding HARQ process in the first symbol after the end of the transmission of the corresponding PSSCH. Upon expiry of the timer drx-HARQ-FB-RTT-TimerSL, the UE starts the timer drx-HARQ-FB-TimerSL for the corresponding HARQ process. While the timer drx-HARQ-FB-TimerSL is running, the UE remains in the DRX active mode to enable reception of the expected HARQ feedback. The UE may stop the timer drx-HARQ-FB-TimerS if the expected HARQ feedback is received.

In the above-procedures, the timers drx-HARQ-RTT-TimerSL and drx-RetransmissionTimerSL may also be selectively applied or not be applied depending on a scheduling mode associated with the HARQ process. For example, if the HARQ process is based on Mode 1 configured SL grant, the UE could refrain from applying the timers drx-HARQ-RTT-TimerSL and drx-RetransmissionTimerSL. In this way, it can be considered that for a Mode 1 configured SL grant the SL HARQ feedback might not trigger a retransmission. The selective application of the timers may be based on indicating the scheduling mode to the receiving UE, e.g., in the PSCCH. Such indication may be explicitly included in SCI or may be implicitly derived from other information indicated on the PSCCH. When using the selective application of the timers, the configuration of the timers drx-HARQ-RTT-TimerSL and drx-RetransmissionTimerSL may be different from the case when the timers are applied in a non-selective manner.

Figure 5:
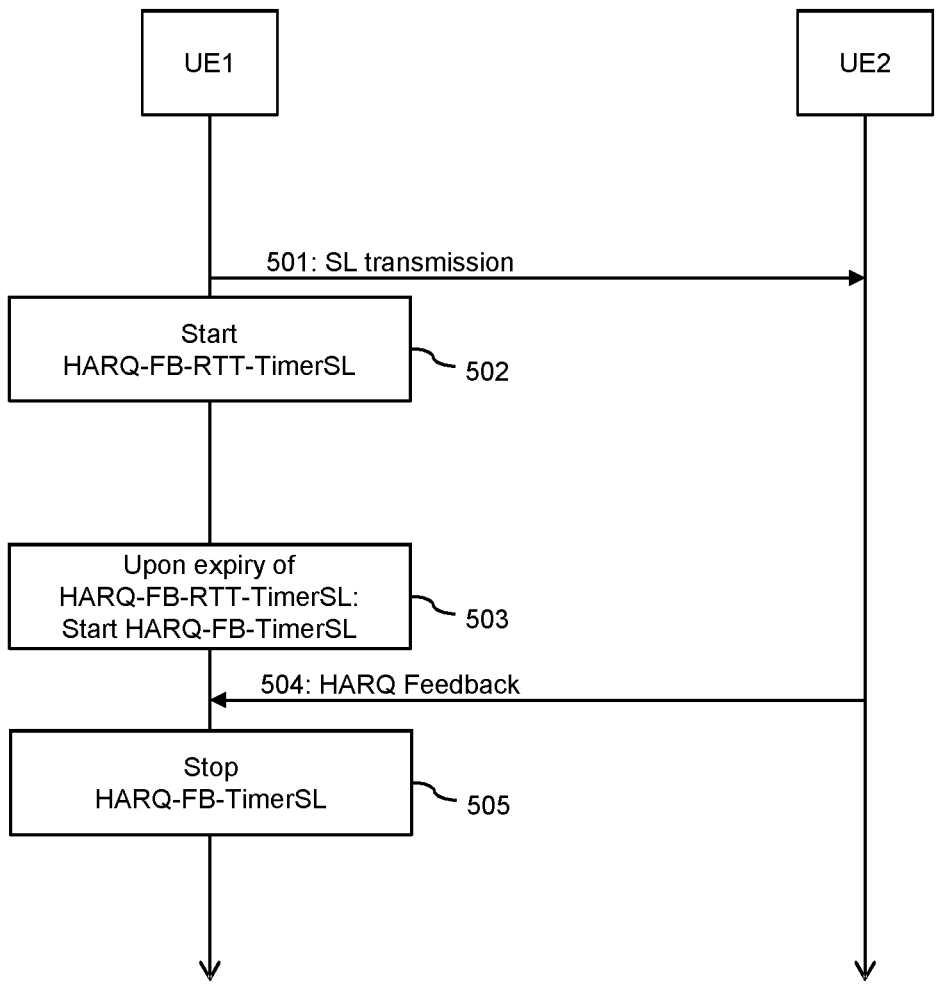
FIG. 5 schematically illustrates a further exemplary scenario in which DRX operation for a D2D transmission is controlled according to an embodiment of the invention.

FIG. 5 shows an example of procedures enabling DRX operation for transmissions of HARQ feedback. The procedures of FIG. 5 involve a first UE (UE1) and a second UE (UE2). In the example of FIG. 4, UE1 sends an SL transmission 501, e.g., carrying a MAC PDU, to UE2. The SL transmission 501 may for example be transmitted based on an SL grant requiring HARQ feedback. Accordingly, as illustrated by block 502, UE1 starts the timer drx-HARQ-FB-RTT-TimerSL for the corresponding HARQ process. This may be accomplished in the first symbol after the end of the corresponding PSSCH transmission, i.e., the SL transmission 501. As illustrated by block 503, when the timer drx-HARQ-FB-RTT-TimerSL expires, UE1 starts the timer drx-HARQ-FB-TimerSL for the corresponding HARQ process. This may be accomplished in the first symbol after the expiry of the timer drx-HARQ-RTT-TimerSL. During the subsequent DRX active time, UE1 receives the HARQ feedback 504 for the SL transmission 501 from UE2. As illustrated by block 505, upon receiving the HARQ feedback 504, UE1 may stop the timer drx-HARQ-FB-TimerSL for the corresponding HARQ process.

In the above procedures, the configuration of the timer drx-HARQ-FB-RTT-TimerSL, i.e., the duration until timer expiry, may be determined based at least on processing capabilities of the UE providing the expected HARQ feedback, i.e., UE2 in the example of FIG. 5. Further, the configuration of the timer drx-HARQ-FB-RTT-TimerSL may be determined depending on time-domain periodicity of the PSFCH resources on the related resource pool, which are used for transmission of the expected HARQ feedback.

In some scenarios, the illustrated concepts may be used for enabling DRX operation for blind retransmissions, which are not triggered by HARQ feedback. In such scenarios, a UE may receive SCI, e.g., carried by the PSCCH or PSSCH, which indicates that no HARQ feedback is expected for the associated SL transmission, e.g., for a transport block carried by the PSSCH. In this case, the UE may however expect to receive blind retransmission in the future. For example, the SCI may indicate time and/or frequency resources where the blind retransmission can be expected. In this case, the UE may start the timer drx-Retx-Proc-TimerSL for the corresponding SL process in the first symbol after the end of the reception of the corresponding PSSCH transmission and stop the timer drx-BlindRetransmissionTimerSL for the corresponding SL process. Upon drx-Retx-Proc-TimerSL expiry and if the data of the corresponding SL process was not successfully decoded, UE may start the timer drx-BlindRetransmissionTimerSL. While the timer drx-BlindRetransmissionTimerSL is running, the UE remains in the DRX active mode to enable reception of the expected blind retransmission. If the UE successfully decodes the blind retransmission for the corresponding SL process while the associated timer drx-BlindRetransmissionTimerSL is running, the UE may stop the timer drx-BlindRetransmissionTimerSL.

Figure 6:
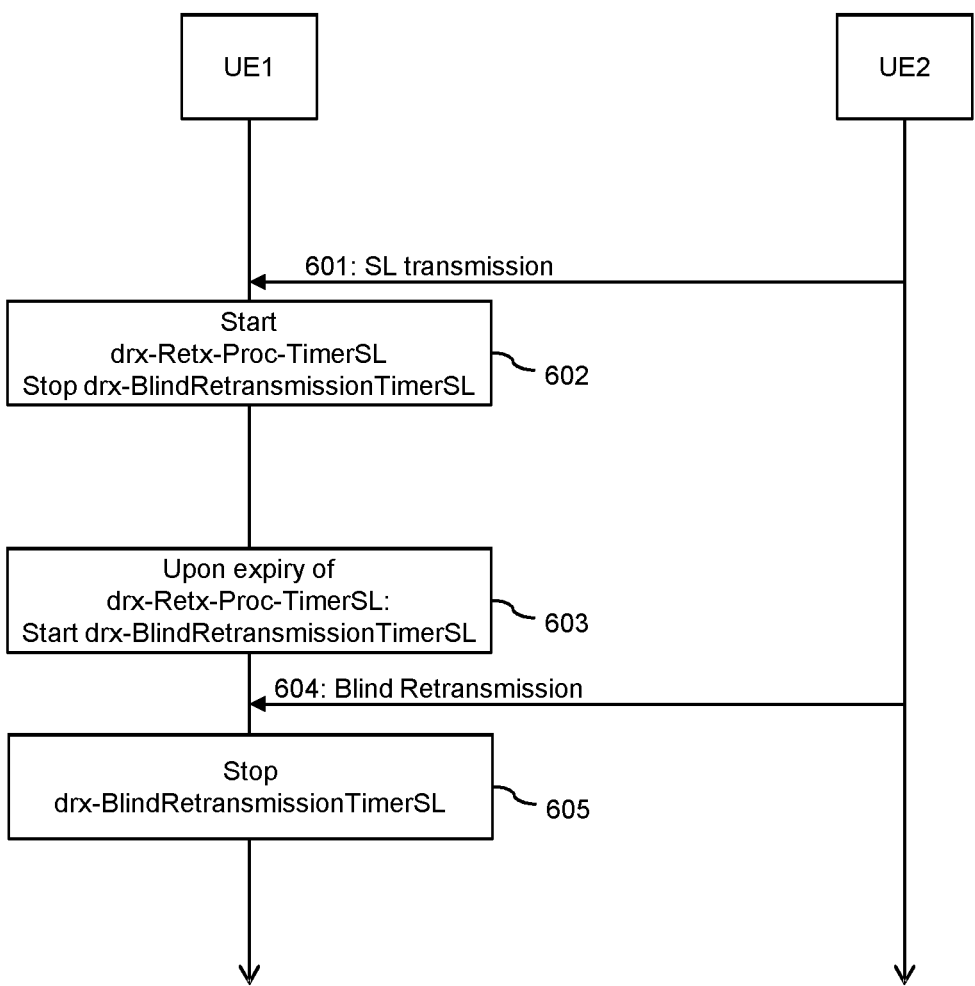
FIG. 6 schematically illustrates a further exemplary scenario in which DRX operation for a D2D transmission is controlled according to an embodiment of the invention.

FIG. 6 shows an example of procedures enabling DRX operation for blind retransmissions. The procedures of FIG. 6 involve a first UE (UE1) and a second UE (UE2). In the example of FIG. 6, UE1 receives an SL transmission 601, e.g., carrying a MAC PDU, which does not require HARQ feedback. The requirement of HARQ feedback may be indicated by SCI related to the SL transmission 601. As illustrated by block 602, upon receiving the SL transmission 601 UE1 starts the drx-Retx-Proc-TimerSL for the corresponding SL process and stops the drx-BlindRetransmissionTimerSL for the corresponding SL process. This may be accomplished in the first symbol after the end of the reception of the corresponding PSSCH, i.e., the SL transmission 601. As illustrated by block 603, when the timer drx-Retx-Proc-TimerSL expires and the data of the corresponding SL process was not successfully decoded, UE1 starts the timer drx-BlindRetransmissionTimerSL for the corresponding SL process. This may be accomplished in the first symbol after the expiry of the timer drx-Retx-Proc-TimerSL. During the subsequent DRX active time, UE1 receives the blind retransmission 604 from UE2. As illustrated by block 605, upon successfully decoding the data from the corresponding SL process, e.g., based on the initial SL transmission 601 and the blind retransmission 605, UE1 stops the timer drx-BlindRetransmissionTimerSL, which may allow UE1 to leave the DRX active mode.

In the above procedures, the configuration of the timer drx-Retx-Proc-TimerSL, i.e., the duration until timer expiry, can be given by a time gap between the two reservations on the PSSCH. This time gap between two reservations may be indicated in the PSCCH, e.g., using an information field of the SCI denoted as "time resource assignment".

In another variant of the above procedures, the UE may also start the drx-BlindRetransmissionTimerSL immediately in response to receiving the SL transmission not requiring HARQ feedback, e.g., in the N-th symbol after the end of the reception of the corresponding PSSCH. Accordingly, starting of the timer drx-BlindRetransmissionTimerSL could also be triggered without using the timer drx-Retx-Proc-TimerSL. The value of N may be determined based on a processing capability of the UE providing the blind retransmission, i.e., UE2 in the example of FIG. 6. of the UE. In some scenarios, the value of N may be N=1.

In both variants of the above-procedures, the configuration of the timer drx-BlindRetransmissionTimerSL, i.e., the duration until timer expiry, may be defined in terms of a number of consecutive SCI, e.g., carried by the PSCCH or PSSCH, indicating the blind retransmissions of the same transport block in an SL process. Further, the configuration of the timer drx-BlindRetransmissionTimerSL, i.e., the duration until timer expiry, may be is defined corresponding to a maximum duration until all blind retransmissions of a transport block are received or a maximum number of blind retransmission is reached. For example, if a UE receives a SL transmission not requiring HARQ feedback, the UE may start the timer drx-Retx-Proc-TimerSL for the corresponding SL process, e.g., in the first symbol after the end of the reception of the corresponding PSSCH, and pause the timer drx-BlindRetransmissionTimerSL for the corresponding SL process if the drx-BlindRetransmissionTimerSL is already started. When the timer drx-Retx-Proc-TimerSL expires, the data of the corresponding SL process was not successfully decoded, and the timer drx-BlindRetransmissionTimerSL was not started yet, the UE may start the timer drx-BlindRetransmissionTimerSL for the corresponding SL process, e.g., in the first symbol after the expiry of drx-Retx-Proc-TimerSL. If the timer drx-BlindRetransmissionTimerSL was started but has not yet expired, the UE may resume the timer drx-BlindRetransmissionTimerSL for the corresponding SL process, e.g., in the first symbol after the expiry of drx-Retx-Proc-TimerSL. If the data of the corresponding SL process was successfully decoded, the UE does not need not to be active/wake-up even though the drx-BlindRetransmissionTimerSL for the corresponding SL process might still be running.

In some scenarios, the illustrated concepts may be used for enabling DRX operation for transmissions related to CSI reporting. In such scenarios, if the PSSCH transmitted by a UE may include a reference signal that triggers a CSI report from the peer UE. Alternatively or in addition, the PSCCH transmitted by the UE may include a CSI report request, As a result, the UE may UE expect to receive a CSI report from the peer UE. The UE may then start the timer drx-CSIReport-RTT-TimerSL, e,g, in the first symbol after the end of the transmission of the corresponding PSSCH or PSCCH. Upon expiry of the timer drx-CSIReport-RTT-TimerSL, the UE may start the timer drx-CSIReport-TimerSL. While the timer drx-CSIReport-TimerSL is running, the UE remains in the DRX active mode to enable reception of the expected CSI report. The UE may stop the timer drx-CSIReport-TimerSL if the corresponding CSI report is received.

Figure 7:
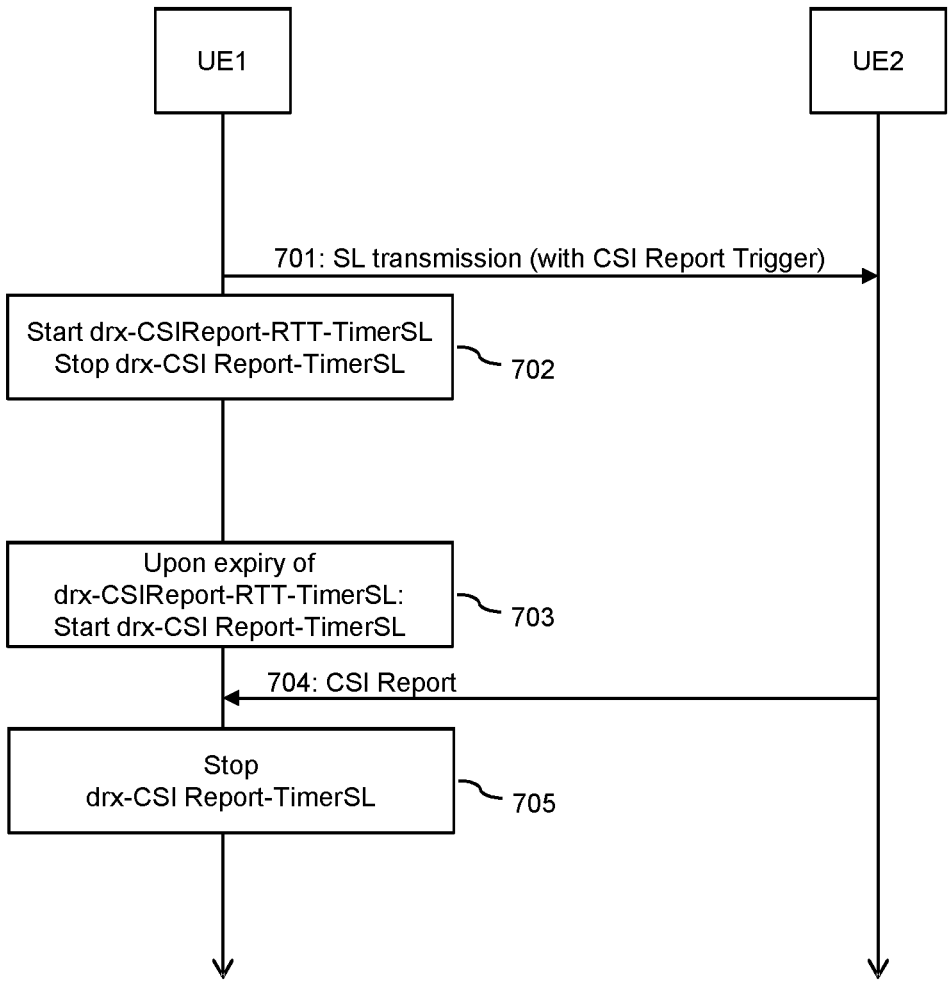
FIG. 7 schematically illustrates a further exemplary scenario in which DRX operation for a D2D transmission is controlled according to an embodiment of the invention.

FIG. 7 shows an example of procedures enabling DRX operation for CSI reporting. The procedures of FIG. 7 involve a first UE (UE1) and a second UE (UE2). In the example of FIG. 7, UE1 sends a SL transmission 701, e.g., carrying a MAC PDU, which triggers a CSI report from UE2. The SL transmission 701 may for example be transmitted based on an SL grant and include a reference signal and/or a request for a CSI report. As illustrated by block 702, upon sending the SL transmission 701, UE1 starts the drx-CSIReport-RTT-TimerSL for the corresponding HARQ process and stops the timer drx-CSIReport-TimerSL for the corresponding SL process. This may be accomplished in the first symbol after the end of the corresponding PSSCH or PSCCH transmission, i.e., the SL transmission 701. As illustrated by block 703, when the timer drx-CSIReport-RTT-TimerSL expires, UE1 starts the timer drx-CSIReport-TimerSL for the corresponding HARQ process. This may be accomplished in the first symbol after the expiry of the timer drx-HARQ-RTT-TimerSL. During the subsequent DRX active time, UE1 receives the CSI report 704 from UE2. As illustrated by block 705, upon successfully receiving the CSI report 704, UE1 stops the timer drx-CSIReport-TimerSL for the corresponding HARQ process, which may allow UE1 to leave the DRX active mode.

In view of efficient utilization of DRX for SL communication and other types of D2D communication, it may be desirable that SL DRX configurations, in particular timers and/or parameters for controlling transitions between the DRX active time and the DRX inactive time, are aligned between peer UEs participating in the D2D communication. Further, it may be desirable that the SL DRX configuration of a UE is aligned with its DRX configuration for DL/UL communication with the wireless communication network, in the following also denoted as DL/UL DRX configuration or, in view of the DRX operation relating to reception of DL transmissions, simply DL DRX configuration. In this way, it can be possible to minimize the duration in which the UE is in the DRX active time. As used herein, a SL DRX configuration may denote a set of one or more parameters which determine the DRX behavior of a UE in SL communication, for example including settings of the above-mentioned timers and other parameters.

In the following, procedures and mechanisms will be described which allow for aligning SL DRX configurations between peer UEs engaged in SL communication. In these explanations, it will be assumed that the SL communication is based on a unicast transmission mode. However, it is noted that the illustrated principles of aligning the SL DRX configurations could also be applied to a group of UEs engaged in SL communication based on a groupcast or broadcast transmission mode. Some of these procedures and mechanisms involve one or more access nodes of the wireless communication network. Like the above-mentioned access node 100, these may correspond to a gNB of the NR technology or an eNB of the LTE technology.

The alignment of the SL DRX configurations can be based on the following variants:

According to a first variant, the RX UE or the serving access node of the RX UE provides the SL DRX configuration for the RX UE and coordinates the SL DRX configuration with the TX UE or the serving access node of the TX UE, e.g., by indicating corresponding configuration information to the TX UE and/ or its serving access node.

According to a second variant, the TX UE or the serving access node of the TX UE provides the SL DRX configuration for the RX UE and coordinates the SL DRX configuration with the RX UE or the serving access node of the RX UE, e.g., by indicating corresponding configuration information to the TX UE and/ or its serving access node.

According to a third variant, an access node performs the alignment between the DL/UL DRX configuration and the SL DRX configuration. The access node may then indicate the DL/UL DRX configuration or the SL DRX configuration to the UE(s). For example, the access node could indicate the DL/UL DRX configuration and a deviation between the DL/UL DRX configuration and the SL DRX configuration. Alternatively, the access node could indicate the SL DRX configuration and a deviation between the SL DRX configuration and the DL/UL DRX configuration. The deviation may be indicated in terms of one or more delta values between corresponding parameters of the DL/UL DRX configuration and the SL DRX configuration.

According to a fourth variant, the TX UE indicates its DL/UL DRX configuration and/or SL DRX configuration to the RX UE, and then the indicated DRX configuration is taken into account by the RX UE when determining the DL/UL DRX configuration and/or SL DRX configuration of the RX UE. Alternatively, the RX UE indicates its DL/UL DRX configuration and/or SL DRX configuration to the TX UE, and then the indicated DRX configuration is taken into account by the TX UE when determining the DL/UL DRX configuration and/or SL DRX configuration of the TX UE.

Figure 8A:
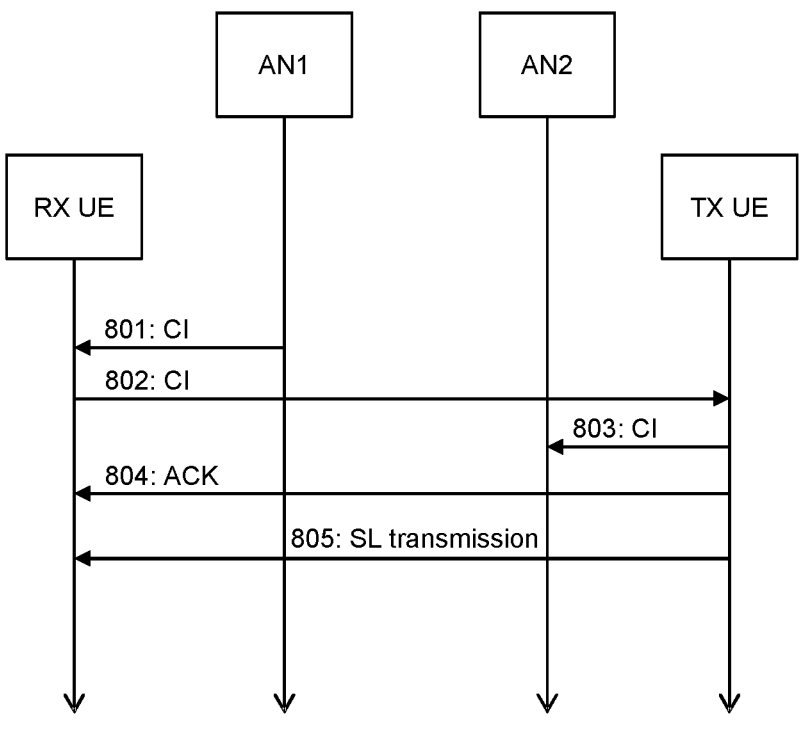
FIG. 8A schematically illustrates an exemplary scenario in which DRX configurations are aligned according to an embodiment of the invention.

FIG. 8A shows an example of processes in which SL DRX configurations are aligned by exchange of configuration information between the RX UE and TX UE. In particular, in the example of FIG. 8A, the RX UE determines its SL DRX configuration and indicates the determined SL DRX configuration to the TX UE. The processes of FIG. 8A involve the RX UE, the TX UE, an access node (AN1) serving the RX UE, and an access node (AN2) serving the TX UE. Here, it is to be noted that in some scenarios, the RX UE and the TX UE could also be served by the same access node.

In the processes of FIG. 8A, the access node AN1 may send configuration information (CI) 801 to the RX UE. The configuration information 801 may for example indicate a DL/UL DRX configuration of the RX UE and/or parameters to be used by the RX UE for determining its SL DRX configuration. In some scenarios, the access node AN1 could also determine the SL DRX configuration for the RX UE and use the configuration information 801 to indicate the SL DRX configuration to the RX UE.

The RX UE then determines its SL DRX configuration and sends configuration information 802 to the TX UE. The configuration information 802 indicates the SL DRX configuration of the RX UE, and the TX UE may consider this indicated SL DRX configuration when sending SL transmissions to the RX UE and when determining its own SL DRX configuration, e.g., by adopting the same or similar parameters of the SL DRX configuration.

As further illustrated, the TX UE may then inform its serving access node AN2 about the SL DRX configuration determined for the RX UE, by sending corresponding configuration information 803 to the access node AN2.

As further illustrated, the TX UE may also send an acknowledgement 804 to the RX UE, indicating that the SL DRX configuration indicated by the configuration information 802 is accepted by the TX UE.

As a result, the SL DRX configurations of the RX UE and the TX UE are aligned. Based on the aligned SL DRX configurations, the TX UE may then send a SL transmission 805 to the RX UE.

As can be seen, in the example of FIG. 8A, the alignment of the SL DRX configurations may be based on exchange of configuration information by a SL transmission conveying the configuration information 802. For example, the SL transmission may include an RRC (Radio Resource Control) message indicating the configuration information 802, e.g., an RRCReconfigurationSidelink message. Alternatively or in addition, at least a part of the configuration information could be indicated by a MAC CE (Control Element) or PHY layer control signaling. Further, also the access nodes AN1, AN2 can be informed about the SL DRX configurations of the RX UE and TX UE. In the example of FIG. 8A, the alignment of the SL DRX configurations could for example be performed when establishing or modifying an AS (Access Stratum) configuration for SL communication between the TX UE and the RX UE.

The indication of the SL DRX configuration from the RX UE to the TX UE may be based on one or more of the following:

In some cases, the RX UE may be configured or pre-configured with multiple SL DRX configurations. For, example a corresponding SL DRX configuration could be configured or pre-configured for each destination identifier, unicast link, or resource pool. The RX UE could then select from these multiple DRX configurations which SL DRX configuration is to be adopted for the SL communication with the TX UE. The selection can also be based on a mapping configured or pre-configured in the RX UE. For example, two SL DRX configurations may be provided, one for SL communication HARQ feedback, and the other for SL communication without HARQ feedback. Depending on whether or not HARQ feedback is used for the SL communication, e.g., depending on the service or QoS (Quality of Service) requirements of the SL communication, the RX UE may select one or the other of the two SL DRX configurations.

In some cases, the RX UE may use RRC signaling over the PC5 interface to indicate the SL DRX configuration to the TX UE, e.g., an RRCReconfigurationSidelink message. The TX UE may then further forward the indicated SL DRX configuration to its serving access node. The TX UE or its serving access node may then decide whether to accept or reject the indicated SL DRX configuration. The TX UE may also inform the RX UE about this decision, e.g., like explained for the message 804. For the latter purpose, the TX UE may use RRC signaling over the PC5 interface.

In some cases, there may be multiple SL connections, e.g., multiple PC5 unicast links, between the RX UE and the TX UE. In such cases, a corresponding SL DRX configuration may be determined for each of the multiple SL connections, and the alignment procedures as explained above may be performed individually for each of the multiple SL connections.

In some cases, the exchange of information concerning the SL DRX configuration to be applied may be performed before establishment of any SL data radio bearer between the RX UE and the TX UE. If the indicated SL DRX configuration is not accepted by the respective other UE, a link failure may be declared and the corresponding SL connection be released.

In some cases, the exchange of information concerning the SL DRX configuration to be applied may relate to only a subset of the parameters of the SL DRX configuration.

In some cases, both the RX UE and the TX UE may be configured or pre-configured with a plurality of candidate SL DRX configurations, and the indication of the SL DRX configuration may be provided by identifying one of the candidate SL DRX configurations, e.g., in by in terms of an index.

In some cases, the TX UE and the RX UE may be provided with a configured or pre-configured common SL DRX configuration and apply this common SL DRX configuration when using one or more SL transmissions for exchanging the information concerning the SL DRX configuration to be applied.

In a variant, the serving access node of the RX UE may provide the SL DRX configuration of the RX UE and indicate it to the serving access node of the TX UE. For this purpose, the serving access node of the RX UE may utilize signaling via an Xn interface to the serving access node of the TX UE or signaling via an AMF (Access and Mobility Management Function) of the wireless communication network. The serving access node of the TX UE may then decide whether to accept or reject the indicated SL DRX configuration and informs the TX UE and/or the serving access node of the RX UE about the decision. The TX UE or the serving access node of the RX UE may then inform the RX UE about the decision. In some variants, the serving access node of the RX UE may indicate the SL DRX configuration to the RX UE only in response to the SL DRX configuration being accepted. If the SL DRX configuration is rejected, the serving access node of the RX UE may indicate an AS layer configuration failure to the RX UE.

Figure 8B:
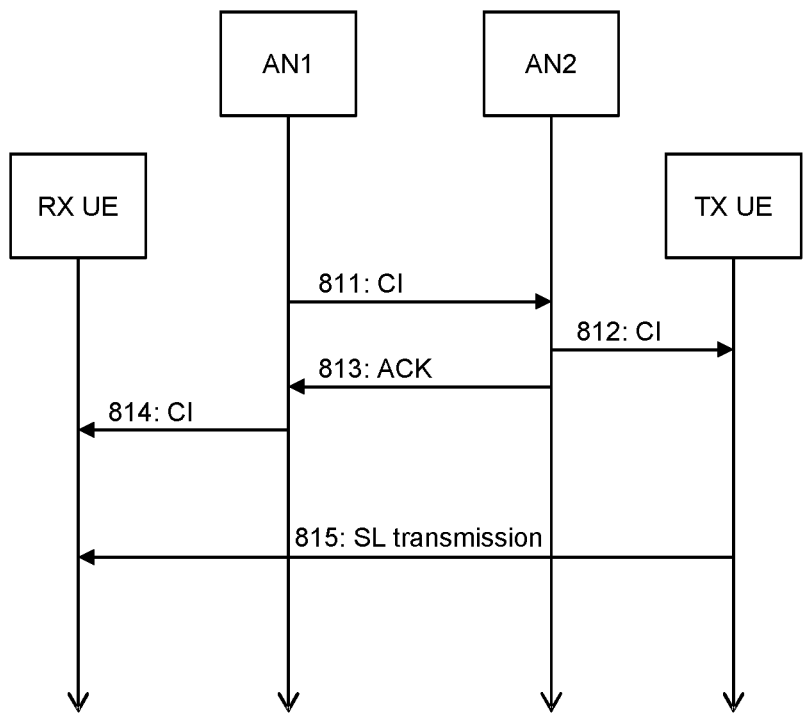
FIG. 8B schematically illustrates a further exemplary scenario in which DRX configurations are aligned according to an embodiment of the invention.

FIG. 8B shows an example of processes where the serving access node of the RX UE provides the SL DRX configuration of the RX UE and indicate it to the serving access node of the TX UE. The processes of FIG. 8B involve the RX UE, the TX UE, the access node (AN1) serving the RX UE, and the access node (AN2) serving the TX UE.

In the processes of FIG. 8B, the access node AN1 generates a SL DRX configuration to be applied by the RX UE and sends configuration information (CI) 811 indicating this SL DRX configuration to the serving access node AN2 of the TX UE. The configuration information 811 may be conveyed by signaling via an Xn interface to the serving access node AN2 of the TX UE or by signaling via an AMF. The serving access node AN2 of the TX UE may then decide whether to accept or reject the indicated SL DRX configuration and informs the TX UE and/or the serving access node AN1 of the RX UE about the decision. In the example of FIG. 8B, the access node AN2 accepts the indicated SL DRX configuration and sends configuration information 812 indicating the SL DRX configuration to the TX UE. Further, the access node AN2 sends an acknowledgement 813 indicating acceptance of the SL DRX configuration to the serving access node AN1 of the RX UE. In response to receiving the acknowledgement, the access node AN1 sends configuration information 814 indicating the accepted SL DRX configuration to the RX UE. As a result, the SL DRX configurations of the RX UE and the TX UE are aligned. Based on the aligned SL DRX configurations, the TX UE may then send a SL transmission 815 to the RX UE.

Upon receiving and accepting the SL DRX configuration of the RX UE, the TX UE may consider the SL DRX configuration of the RX UE when sending SL transmissions to the RX UE. In other words, the TX UE may transmit SCI and SL data only when RX UE is awake and able to receive SL transmissions from the TX UE. Further, upon receiving and accepting the SL DRX configuration of the RX UE, either provided by the TX UE itself or by the serving access node of the TX UE, the TX UE adopts the same SL DRX configuration for its own SL DRX procedure when receiving SL transmissions from the RX UE.

Accordingly, in some scenarios, the RX UE may generate, receive, or select the SL DRX configuration to be used and send this SL DRX configuration to the TX UE so that the TX UE knows when the RX UE is awake and able to receive SL transmissions. This variant could be applied, e.g., when the RX UE is out of coverage or in an RRC_IDLE/INACTIVE state. In such cases, transmission of the configuration information 801 could be omitted.

In some scenarios, the RX UE could be in coverage and in RRC_CONNECTED state. In such scenarios, the RX UE could send an AS configuration request for SL communication with the TX UE, e.g., a SidelinkUEInformation message, to the access node AN1. Upon receiving the AS configuration request from the RX UE, the access node AN1 could provide the configuration 801, thereby indicating the SL DRX configuration to the RX UE. In this case, the configuration information 801 could for example be conveyed by an RRC message, e.g., in an information element denoted as SL-ConfigDedicatedNR.

Figure 9A:
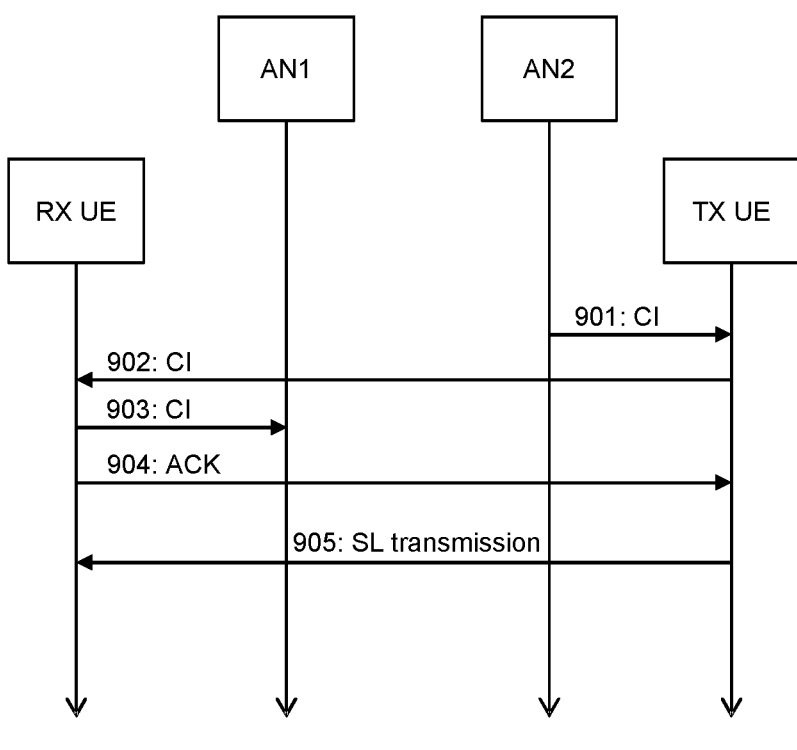
FIG. 9A schematically illustrates a further exemplary scenario in which DRX configurations are aligned according to an embodiment of the invention.

FIG. 9A shows an example of processes in which SL DRX configurations are aligned by exchange of configuration information between the RX UE and TX UE. In particular, in the example of FIG. 9A, the TX UE determines an SL DRX configuration to be applied by the RX UE and indicates the determined SL DRX configuration to the RX UE. The processes of FIG. 9A involve the RX UE, the TX UE, an access node (AN1) serving the RX UE, and an access node (AN2) serving the TX UE. Here, it is to be noted that in some scenarios, the RX UE and the TX UE could also be served by the same access node.

In the processes of FIG. 9A, the access node AN2 may send configuration information (CI) 901 to the TX UE. The configuration information 901 may for example indicate a DL/UL DRX configuration of the TX UE and/or parameters to be used by the TX UE for determining the SL DRX configuration to be applied by the RX UE. In some scenarios, the access node AN2 could also determine the SL DRX configuration to be applied by the RX UE and use the configuration information 901 to indicate the SL DRX configuration to the TX UE. In some scenarios, the TX UE may also use the configuration information 901 to determine its own SL DRX configuration.

The TX UE then determines the SL DRX configuration to be applied by the RX UE and sends configuration information 902 to the RX UE. The configuration information 902 indicates the SL DRX configuration to be applied by RX UE, and the RX UE may consider this indicated SL DRX configuration when determining its own SL DRX configuration, e.g., by adopting parameters of the indicated SL DRX configuration, by modifying the indicated SL DRX configuration, or by rejecting the indicated SL DRX configuration.

As further illustrated, the RX UE may also inform its serving access node AN1 about the SL DRX configuration determined for the RX UE, by sending configuration information 903 to the access node AN1.

As further illustrated, the RX UE may also send an acknowledgement 904 to the RX UE, indicating that the SL DRX configuration indicated by the configuration information 902 is accepted by the RX UE.

As a result, the SL DRX configurations of the RX UE and the TX UE are aligned. Based on the aligned SL DRX configurations, the TX UE may then send a SL transmission 905 to the RX UE.

As can be seen, in the example of FIG. 9A, the alignment of the SL DRX configurations may be based on exchange of configuration information by a SL transmission conveying the configuration information 902. For example, the SL transmission may include an RRC message indicating the configuration information 902, e.g., an RRCReconfigurationSidelink message. Alternatively or in addition, at least a part of the configuration information could be indicated by a MAC CE or PHY layer control signaling. Further, also the access nodes AN1, AN2 can be informed about the SL DRX configurations of the RX UE and TX UE. In the example of FIG. 9A, the alignment of the SL DRX configurations could for example be performed when establishing or modifying an AS configuration for SL communication between the TX UE and the RX UE.

Accordingly, in some scenarios, the TX UE may generate, receive, or select the SL DRX configuration to be used and send this SL DRX configuration to the RX UE. The TX UE is thus aware about the SL DRX configuration of the RX UE and knows when the RX UE is awake and able to receive SL transmissions. This variant could be applied, e.g., when the TX UE is out of coverage or in an RRC_IDLE/INACTIVE state. In such cases, transmission of the configuration information 901 could be omitted.

In some scenarios, the TX UE could be in coverage and in RRC_CONNECTED state. In such scenarios, the TX UE could send an AS configuration request for SL communication with the RX UE, e.g., a SidelinkUEInformation message, to the access node AN2. Upon receiving the AS configuration request from the TX UE, the access node AN2 could provide the configuration 901, thereby indicating the SL DRX configuration to the TX UE. In this case, the configuration information 901 could for example be conveyed by an RRC message, e.g., in an information element denoted as SL-ConfigDedicatedNR. Accordingly, the serving access node of the TX UE, upon receiving an AS configuration request from the TX UE, could generate the SL DRX configuration to be used by the RX UE and indicate this SL DRX configuration to the TX UE. The TX UE may then further indicate the SL DRX configuration to the RX UE. The RX UE may immediately adopt this SL DRX configuration or use it as a basis for determining an updated SL DRX configuration to be applied by the RX UE.

Accordingly, in some scenarios the TX UE may provide the SL DRX configuration to be used by RX UE and send it to the RX UE so that the RX UE knows when it should be awake and able to receive SL transmissions. The TX UE may for example provide the SL DRX configuration upon the establishment or modification of an AS configuration for SL communication with the RX UE.

In some scenarios, when the TX UE and the RX UE have agreed on the SL DRX configuration to be applied by the RX UE, the TX UE may consider the SL DRX configuration of the RX UE when performing SL transmissions to the RX UE. For example, the TX UE could transmit only when the RX UE is awake and able to receive SL transmissions from the TX UE.

The indication of the SL DRX configuration from the TX UE to the RX UE may be based on one or more of the following:

In some cases, the TX UE may use RRC signaling over the PC5 interface to indicate the SL DRX configuration to the RX UE, e.g., an RRCReconfigurationSidelink message. The RX UE may then further forward the indicated SL DRX configuration to its serving access node. The RX UE or its serving access node may then decide whether to accept or reject the indicated SL DRX configuration, or whether to update the indicated SL DRX configuration. The RX UE may also inform the TX UE about this decision, e.g., like explained for the message 904, if applicable also indicating the updated SL DRX configuration. For the latter purpose, the TX UE may use RRC signaling over the PC5 interface.

When the RX UE has indicated an updated SL DRX configuration, the TX UE or its serving access node may determine whether to accept the updated SL DRX configuration and inform the RX UE about the decision. If the TX UE and the RX UE have agreed on an SL DRX configuration, the TX UE should only send the SCI and SL data to the RX UE when, according to the agreed SL DRX configuration, the RX UE is expected to be awake. If the TX UE and RX UE do not agree on an SL DRX configuration, a AS configuration failure procedure may be triggered and the corresponding bearer(s) may be released.

In some cases, the RX UE may inform its serving access node about the SL DRX configuration indicated by the TX UE, e.g., like explained for the configuration information 903, and the serving access node of the RX UE may inform the RX UE whether the indicated SL DRX configuration is accepted or rejected, whether an updated SL DRX configuration needs to be determined from the indicated SL DRX configuration.

In some cases, the TX UE may indicate the updated SL DRX configuration provided by the RX UE to the serving access node of the TX UE, and the serving access node of the TX UE may informs the TX UE whether the updated SL DRX configuration is accepted or rejected.

In some cases, there may be multiple SL connections, e.g., multiple PC5 unicast links, between the RX UE and the TX UE. In such cases, a corresponding SL DRX configuration may be determined for each of the multiple SL connections, and the alignment procedures as explained above may be performed individually for each of the multiple SL connections.

In some cases, the exchange of information concerning the SL DRX configuration to be applied may be performed before establishment of any SL data radio bearer between the RX UE and the TX UE. If the indicated SL DRX configuration is not accepted by the respective other UE, a link failure may be declared and the corresponding SL connection be released.

In some cases, the exchange of information concerning the SL DRX configuration to be applied may relate to only a subset of the parameters of the SL DRX configuration.

In some cases, both the RX UE and the TX UE may be configured or pre-configured with a plurality of candidate SL DRX configurations, and the indication of the SL DRX configuration may be provided by identifying one of the candidate SL DRX configurations, e.g., in by in terms of an index.

In some cases, the TX UE and the RX UE may be provided with a configured or pre-configured common SL DRX configuration and apply this common SL DRX configuration when using one or more SL transmissions for exchanging the information concerning the SL DRX configuration to be applied.

In a variant, the serving access node of the TX UE may provide the SL DRX configuration for the RX UE and indicate it to the serving access node of the RX UE. For this purpose, the serving access node of the RX UE may utilize signaling via an Xn interface to the serving access node of the TX UE or signaling via an AMF of the wireless communication network. The serving access node of the RX UE may then decide whether to accept or reject the indicated SL DRX configuration, or whether the indicated SL DRX configuration should be updated, and inform the RX UE and/or the serving access node of the TX UE about the decision, or if applicable, about the updated SL DRX configuration. The RX UE or the serving access node of the TX UE may then inform the TX UE about the decision.

Figure 9B:
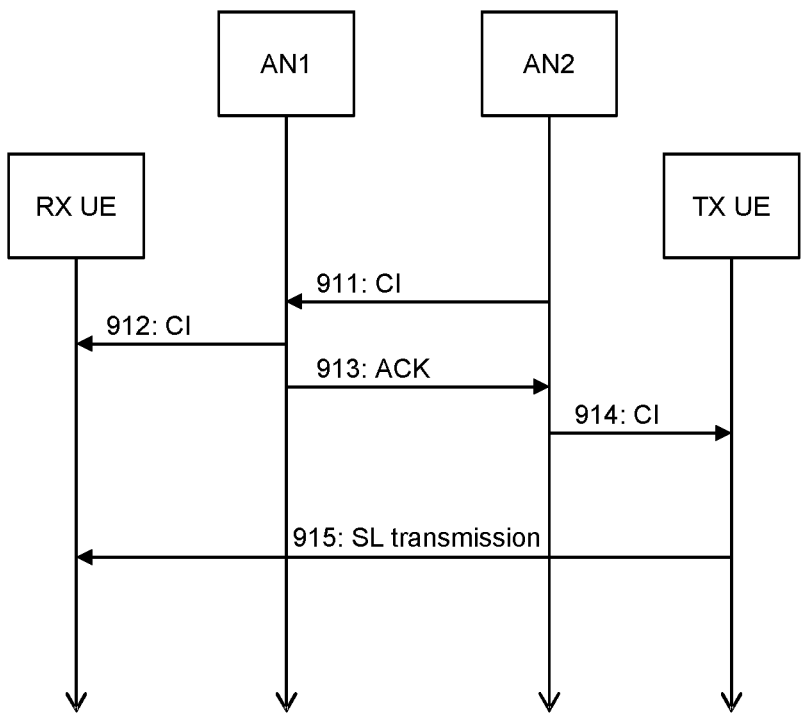
FIG. 9B schematically illustrates a further exemplary scenario in which DRX configurations are aligned according to an embodiment of the invention.

FIG. 9B shows an example of processes where the serving access node of the TX UE provides the SL DRX configuration of the RX UE and indicate it to the serving access node of the RX UE. The processes of FIG. 9B involve the RX UE, the TX UE, the access node (AN1) serving the RX UE, and the access node (AN2) serving the TX UE.

In the processes of FIG. 9B, the access node AN2 generates a SL DRX configuration to be applied by the RX UE and sends configuration information (CI) 911 indicating this SL DRX configuration to the serving access node AN1 of the RX UE. The configuration information 911 may be conveyed by signaling via an Xn interface to the serving access node AN1 of the RX UE or by signaling via an AMF. The serving access node AN1 of the TX UE may then decide whether to accept or reject the indicated SL DRX configuration, or whether the indicated SL DRX configuration should be updated, and informs the RX UE and/or the serving access node AN2 of the TX UE about the decision. In the example of FIG. 9B, the access node AN1 accepts the indicated SL DRX configuration and sends configuration information 912 indicating the SL DRX configuration to the RX UE. Further, the access node AN1 sends an acknowledgement 913 indicating acceptance of the SL DRX configuration to the serving access node AN2 of the TX UE. In response to receiving the acknowledgement 913, the access node AN2 sends configuration information 914 indicating the accepted SL DRX configuration to the TX UE. As a result, the SL DRX configurations of the RX UE and the TX UE are aligned. Based on the aligned SL DRX configurations, the TX UE may then send a SL transmission 915 to the RX UE.

As mentioned above, it may also be desirable to perform alignment of SL DRX configuration and DL/UL DRX configuration. Here, specifically two types of alignment are relevant: alignment of the DL/UL DRX configuration of the RX UE with the SL DRX configuration of the RX UE, and alignment of the DL/UL DRX configuration of the TX UE with the SL DRX configuration of the RX UE.

The DL/UL DRX configuration may include one or more of the following parameters and timers:

a timer denoted as "drx-onDurationTimer", which defines a duration at the beginning of a DL/UL DRX cycle;

a parameter denoted as "drx-SlotOffset", which defines a delay before starting the timer drx-onDurationTimer;

a parameter denoted as "drx-LongCycleStartOffset, which defines a long DL/UL DRX cycle;

a parameter denoted as "drx-StartOffset", which defines a subframe where the (long or short) DL/UL DRX cycle starts;

an optional parameter denoted as "drx-ShortCycle", which defines a short DL/UL DRX cycle;

an optional timer denoted as "drx-ShortCycleTimer" which denotes a duration for which the UE shall follow the short DL/UL DRX cycle;

a timer denoted as "drx-InactivityTimer, which defines a duration after receiving the PDCCH (Physical Downlink Control Channel) occasion including DCI information which indicates a new DL or UL (uplink) transmission;

a timer denoted as "drx-RetransmissionTimerDL", which defines a maximum duration until a DL retransmission is received, typically defined per DL HARQ process, except for the broadcast SL transmissions;

a timer denoted as "drx-RetransmissionTimerUL", which defines a maximum duration until a UL retransmission is received, typically defined per UL HARQ process, except for the broadcast SL transmissions;

a timer denoted as "drx-HARQ-RTT-TimerDL", which defines a minimum duration before a DL retransmission grant on the PDCCH for DL HARQ retransmission is expected by the MAC entity, typically defined per DL HARQ process;

a timer denoted as "drx-HARQ-RTT-TimerUL", which defines a minimum duration before a DL retransmission grant on the PDCCH for UL HARQ retransmission is expected by the MAC entity, typically defined per UL HARQ process.

When DL/UL DRX is configured, the UE should wake up, i.e. be in DRX active time, when any of the timer drx-onDurationTimer, the timer drx-InactivityTimer, the timer drx-RetransmissionTimerDL, or the timer drx-RetransmissionTimerUL is running. If the received PDCCH indicates a new transmission (DL or UL), the timer drx-InactivityTimer is started or restarted. When the timer drx-InactivityTimer expires, the UE uses the short DRX cycle and starts or restarts drx-ShortCycleTimer if the short DRX Cycle is configured, otherwise it uses the long DRX cycle. If the PDCCH indicates a UL transmission or a MAC PDU is transmitted in a configured UL grant, the timer drx-HARQ-RTT-TimerUL is started and the timer drx-Retransmission-TimerUL is stopped for the corresponding HARQ process after the end of the first repetition of the corresponding PUSCH transmission. If the timer drx-HARQ-RTT-TimerUL expires, drx-RetransmissionTimerUL is started for the corresponding HARQ process. If the PDCCH indicates a DL transmission or a MAC PDU is received in a configured DL grant, the timer drx-HARQ-RTT-TimerDL is started and drx-RetransmissionTimerDL is stopped for the corresponding HARQ process after the end of the corresponding transmission carrying the DL HARQ feedback. If the timer drx-HARQ-RTT-TimerDL expires and the data of the corresponding HARQ process was not successfully decoded, the timer drx-RetransmissionTimerDL is started for the corresponding HARQ process.

Alignment of the DL/UL DRX configuration of the RX UE with the SL DRX configuration of the RX may be performed by the RX UE itself or by the access node serving the RX UE. For example, if the alignment is performed by the serving access node of the RX UE, the access node could indicate the SL DRX configuration and the DL/UL DRX configuration to the RX UE, by using an relation the SL DRX configuration and the DL/UL DRX configuration. In particular, rather than indicating a first set of parameters for the SL DRX configuration and an independent second set of parameters for the DL/UL DRX configuration, the access node may indicate one set of parameters for one of the SL DRX configuration or the DL/UL DRX configuration, and indicate the other of the SL DRX configuration and the DL/UL DRX configuration in terms of a deviation from the indicated set of parameters, e.g., in terms of one or more delta values each representing a difference of a parameter of the SL DRX configuration and a corresponding parameter of the DL/UL DRX configuration. By way of example, for the timer drx-InactivityTimerSL, the serving access node could indicate the setting for the timer drx-InactivityTimer of the DL/UL DRX configuration and a delta value indicating the difference between the settings of the timers drx-Inactivity-Timer and drx-InactivityTimerSL. Alternatively, the serving access node could indicate the setting for the timer drx-InactivityTimerSL of the SL DRX configuration and a delta value indicating the difference between the settings of the timers drx-InactivityTimer and drx-InactivityTimerSL. A similar approach could be adopted to all parameters applied in both the SL DRX configuration and the DL/UL DRX configuration, however with potentially with different setting.

Figure 10:
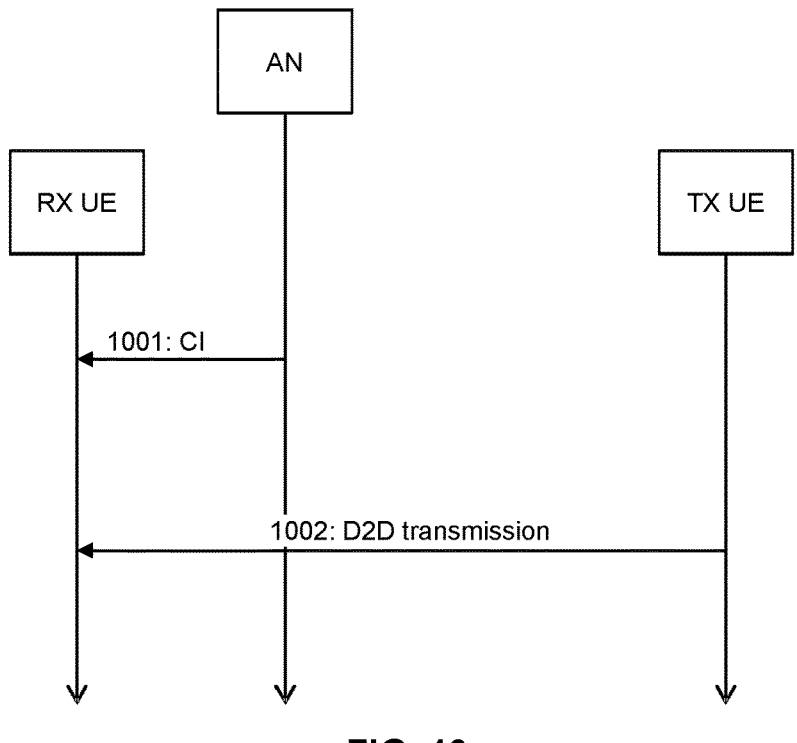
FIG. 10 schematically illustrates a further exemplary scenario in which DRX configurations are aligned according to an embodiment of the invention.

FIG. 10 shows an example of processes in which the SL DRX configuration and the DL/UL DRX configuration of the RX UE are aligned by the access node serving the RX UE. The processes of FIG. 10 involve the RX UE, the TX UE, and the access node (AN) serving the RX UE.

In the example of FIG. 10, the access node AN serving the RX UE sends configuration information (CI) 1001 to the RX UE. The configuration information 1001 indicates at least a part of the SL DRX configuration to be applied by the RX UE, and at least a part of the DL/UL DRX configuration to be applied by the RX UE. The configuration information indicates a set of parameters for the DL/UL DRX configuration and, for the SL DRX configuration, a deviation from the indicated set of parameters, e.g., in terms of one or more delta values each representing a difference of a parameter of the SL DRX configuration and a corresponding parameter of the DL/UL DRX configuration. Alternatively, the configuration information 1001 may indicate a set of parameters for the SL DRX configuration and, for the DL/UL DRX configuration, a deviation from the indicated set of parameters, e.g., in terms of one or more delta values each representing a difference of a parameter of the SL DRX configuration and a corresponding parameter of the DL/UL DRX configuration. Based on the configuration information 1001 the RX UE determines and aligns its SL DRX configuration and DL/UL DRX configuration. Based on the aligned DRX configurations, the RX UE may then receive a SL transmission 1002 from the TX UE.

In some scenarios, the alignment of SL DRX configuration and DL/UL DRX configuration may involve that the TX UE or the access node serving the TX UE provides the SL DRX configuration to be applied by the RX UE and indicates this SL DRX configuration to the RX, e.g., like in the examples of FIGS. 9A and 9B. In such cases, when providing the SL DRX configuration, the TX UE or the access node serving the TX UE may take into account the DL/UL DRX configuration of the RX UE. Information on the DL/UL DRX configuration of the RX UE may be obtained from the RX UE or from the access node serving the RX UE. For example, the RX UE may use a SL transmission to indicate its DL/UL DRX configuration to the TX UE, e.g., RRC signaling over the PC5 interface, and optionally the TX UE may forward this information to its serving access node. Further, the serving access node of the RX UE may indicate the DL/UL DRX configuration of the RX UE to the serving access node of the TX UE, e.g., via the Xn interface or via an AMF, and optionally the serving access node of the TX UE may forward this information to the TX UE.

Figure 11:
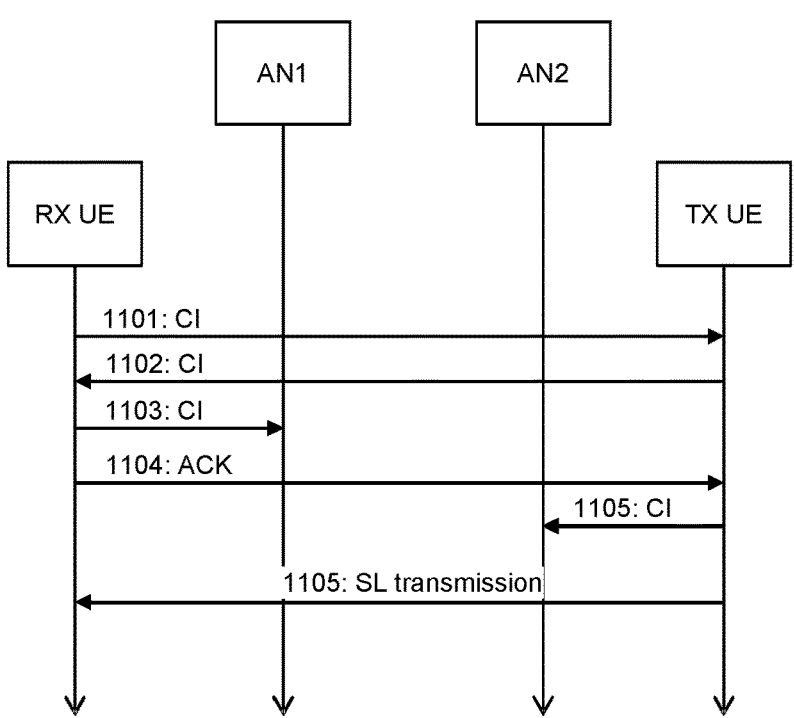
FIG. 11 schematically illustrates a further exemplary scenario in which DRX configurations are aligned according to an embodiment of the invention.

FIG. 11 shows an example of processes in which the SL DRX configuration and the DL/UL DRX configuration of the RX UE are aligned by the TX UE. The processes of FIG. 11 involve the RX UE, the TX UE, the access node (AN1) serving the RX UE, and the access node (AN2) serving the TX UE.

In the example of FIG. 11, the RX UE sends configuration information (CI) 1101 to the TX UE. The configuration information 1101 indicates a DL/UL DRX configuration of the RX UE.

Based on the indicated DL/UL DRC configuration, the TX UE then determines the SL DRX configuration to be applied by the RX UE and sends configuration information 1102 to the RX UE. The configuration information 1102 indicates the SL DRX configuration to be applied by the RX UE, and the RX UE may consider this indicated SL DRX configuration when determining its own SL DRX configuration, e.g., by adopting the parameters of the indicated SL DRX configuration, by modifying the indicated SL DRC configuration, or by rejecting the indicated SL DRX configuration.

As further illustrated, the RX UE may also inform its serving access node AN1 about the SL DRX configuration determined for the RX UE, by sending corresponding configuration information 1103 to the access node AN1.

As further illustrated, the RX UE may also send an acknowledgement 1104 to the TX UE, indicating that the SL DRX configuration indicated by the configuration information 1102 was accepted by the RX UE.

As further illustrated, the TX UE may also inform its serving access node AN2 about the SL DRX configuration determined for the RX UE, by sending corresponding configuration information 1105 to the access node AN2.

As a result, the SL DRX configuration and the DL/UL of the RX UE are aligned. Based on the aligned DRX configurations, the RX UE may then receive a SL transmission 1105 from the TX UE.

In a variant, in cases where the TX UE or the access node serving the TX UE provides the SL DRX configuration to be applied by the RX UE, e.g., like in the examples of FIGS. 9A, 9B, and 11, the TX UE may inform the RX UE about the SL DRX configuration of the RX UE, e.g., by sending an SL transmission, e.g., like the SL transmission carrying the configuration information 902 or 1102. The RX UE may then forward this information to its serving access node, e.g., by sending corresponding configuration information, like the configuration information 903, 1103. The serving access node of the RX UE can then adjust or reconfigure the DL/UL DRX configuration of the RX UE.

For alignment of the DL/UL DRX configuration of the TX UE and the SL DRX configuration of the RX UE, the TX UE or the access node serving the TX UE may provide the SL DRX configuration to be applied by the RX UE, e.g., like in the examples of FIGS. 9A, 9B, and 11. In such cases, the TX UE or the access node serving the TX UE may also consider the DL/UL DRX configuration of the TX UE when determining the SL DRX configuration to be applied by the RX UE. If the alignment is performed by the serving access node of TX UE, the serving access node of the TX UE may also utilize the above-mentioned option of indicating one set of parameters for one of the SL DRX configuration or the DL/UL DRX configuration to the TX UE, and indicate the other of the SL DRX configuration and the DL/UL DRX configuration in terms of a deviation from the indicated set of parameters, e.g., in terms of one or more delta values each representing a difference of a parameter of the SL DRX configuration and a corresponding parameter of the DL/UL DRX configuration.

In some scenarios, alignment of the DL/UL DRX configuration of the TX UE and the SL DRX configuration of the RX UE may also be achieved in cases where the RX UE or the access node serving the RX UE provides the SL DRX configuration to be applied by the RX UE, e.g., like in the examples of FIGS. 8A, 8B, and 10. In such cases, when providing the SL DRX configuration, the RX UE or the access node serving the RX UE may take into account the DL/UL DRX configuration of the TX UE. Information on the DL/UL DRX configuration of the TX UE may be obtained from the TX UE or from the access node serving the TX UE. For example, the TX UE may use a SL transmission to indicate its DL/UL DRX configuration to the RX UE, e.g., RRC signaling over the PC5 interface, and optionally the RX UE may forward this information to its serving access node. Further, the serving access node of the TX UE may indicate the DL/UL DRX configuration of the TX UE to the serving access node of the RX UE, e.g., via the Xn interface or via an AMF, and optionally the serving access node of the RX UE may forward this information to the RX UE.

In a variant, in cases where the RX UE or the access node serving the RX UE provides the SL DRX configuration to be applied by the RX UE, e.g., like in the examples of FIGS. 8A, 8B, and 10, the RX UE may inform the TX UE about the SL DRX configuration of the RX UE, e.g., by sending an SL transmission, e.g., like the SL transmission carrying the configuration information 802. The TX UE may then forward this information to its serving access node, e.g., by sending corresponding configuration information, like the configuration information 803. The serving access node of the TX UE can then adjust or reconfigure the DL/UL DRX configuration of the TX UE.

Figure 12:
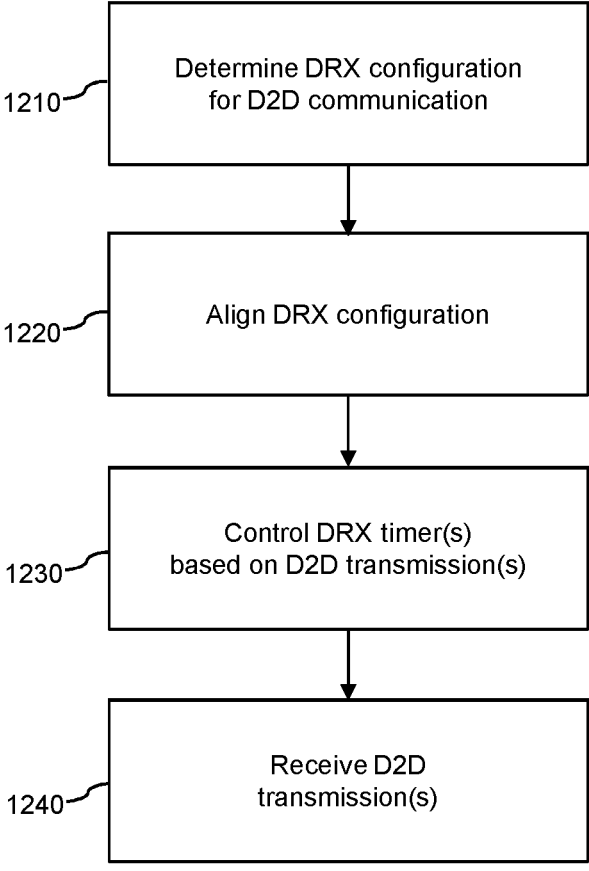
FIG. 12 shows a flowchart for schematically illustrating a method according to an embodiment of the invention.

FIG. 12 shows a flowchart for illustrating a method, which may be utilized for implementing the illustrated concepts. The method of FIG. 12 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 12 may be performed and/or controlled by one or more processors of the wireless communication device. Such wireless communication device may also include a memory storing program code for implementing at least some of the below described functionalities or steps of the method of FIG. 12.

At step 1210, the wireless communication device determines a DRX configuration for D2D communication with a further wireless communication devices. The DRX configuration is based on at least one timer maintained by the wireless communication device. The D2D communication may for example correspond to SL communication via the PC5 interface of the LTE technology or of the NR technology. The DRX configuration may for example correspond to the above-mentioned SL DRX configuration to be applied by the RX UE.

The wireless communication device may determine at least a part of the DRX configuration based on a DRX configuration for downlink or uplink communication with the wireless communication network. Further, the wireless communication device may determine at least a part of the DRX configuration depending on characteristics of D2D communication between the wireless communication device and the further wireless communication device, e.g., depending on whether HARQ feedback or other acknowledgement feedback is required.

At step 1220, the wireless communication device may align the DRX configuration with the further wireless communication device. The alignment of step 1220 may cause the further wireless communication device to refrain from sending a D2D transmission to the wireless communication device while, according to the aligned DRX configuration, the wireless communication device is not in an active mode enabling reception of the D2D transmission, e.g., not in DRX active time. The alignment of step 1230 may for example be performed with respect to a duration of the at least one timer and/or parameters for deriving a duration of the at least one timer.

The alignment of step 1220 may involve that the wireless communication device determines configuration information for at least a part of the DRX configuration and indicates the determined configuration information to the further wireless communication device. For example, this may be accomplished by sending configuration information, e.g., like the configuration information 802 in the example of FIG. 8A. In some scenarios, the wireless communication devices may indicates the determined configuration information by a D2D transmission to the further wireless communication device. The configuration information could then be indicated by RRC information, MAC control information, and/or PHY layer control information conveyed by the D2D transmission to the further wireless communication device. In some scenarios, the wireless communication device could also send the configuration information indirectly, e.g., via an access node serving the wireless communication device and/or an access node serving the further wireless communication device.

In addition or as an alternative, the alignment of step 1220 may involve that the wireless communication device determines configuration information for at least a part of the DRX configuration and indicates the determined configuration information to a node of the wireless communication network to which the further wireless communication device is associated, e.g., an access node serving the further wireless communication device. This can also be accomplished indirectly via the further wireless communication device or an access node serving the wireless communication device. For example, the wireless communication device could send configuration information to the further wireless communication device, e.g., like the configuration information 802, and the further wireless communication device could then propagate this configuration information to its service access node, e.g., like with the configuration information 803.

In addition or as an alternative, the alignment of step 1220 may involve that the wireless communication device determines configuration information for at least a part of the DRX configuration and indicates the determined configuration information to a node of the wireless communication network to which the wireless communication device is associated, e.g., an access node serving the wireless communication device, e.g., like with the configuration information 903 or 1103.

In some scenarios, the wireless communication device may determine at least a part of the configuration information based on configuration information received from a node of the wireless communication network, e.g., from an access node serving the wireless communication device, like with the configuration information 801, 814, 912, or 1001.

In some scenarios, the wireless communication device may determine at least a part of the configuration information based on a DRX configuration for DL or UL communication with the wireless communication network.

In some scenarios, the wireless communication device may determine at least a part of the configuration information based on depending on characteristics of D2D communication between the wireless communication device and the further wireless communication device, e.g., depending on whether HARQ feedback or other acknowledgement feedback is required.

In some scenarios, the alignment of step 1220 may involve that in response to indicating the determined configuration information, the wireless communication device receives acknowledgement information indicating whether the determined configuration information is accepted, e.g., like the acknowledgement 804.

In some scenarios, the alignment of step 1220 may involve that in response to indicating the determined configuration information to the node, the wireless communication device receiving acknowledgement information from the node, the acknowledgement information indicating whether the determined configuration information is accepted, and that the wireless communication device forwards the acknowledgement information to the further wireless communication device.

In some scenarios, the alignment of step 1220 may involve that in response to the acknowledgement information indicating that the determined configuration information is not accepted, the wireless communication device declares failure of a D2D link between the wireless communication device and the further wireless communication device. In some cases, the alignment of step 1220 may additionally or alternatively involve that in response to the acknowledgement information indicating that the determined configuration information is not accepted, the wireless communication device initiates release or reconfiguration of a bearer configured on a D2D link between the wireless communication device and the further wireless communication device. The latter variant may for example be useful if multiple bearers are configured on the D2D link and the not-accepted configuration information relates to only a subset of the bearers.

In some scenarios, the alignment of step 1220 may involve that the wireless communication device receives configuration information from the further wireless communication device and determines at least a part of the DRX configuration based on the configuration information received from the further wireless communication device, e.g., like with the configuration information 902, 1102.

In some scenarios, the alignment of step 1220 may involve that the wireless communication device receives configuration information from the further wireless communication device and, based on the received configuration information, determines a DRX configuration for downlink or uplink communication with the wireless communication network, e.g., like with the configuration information 1102. This configuration information may be received based on a D2D transmission received from the further wireless communication device. The received configuration information may then be indicated by RRC control information, MAC control information, and/or physical layer control information conveyed by the D2D transmission from the further wireless communication device. In some scenarios, the wireless communication device could also receive the configuration information indirectly, e.g., via an access node serving the wireless communication device and/or an access node serving the further wireless communication device.

In some scenarios, the wireless communication device may forward at least a part of the configuration information received from the further wireless communication device to a node of the wireless communication network, e.g., a serving access node of the wireless communication device. The forwarded configuration may correspond to at least a part of the determined DRX configuration for D2D communication. The wireless communication device may then receive acknowledgement information from the node. This acknowledgement information may indicate whether the forwarded configuration information is accepted. The wireless communication device may then forward the acknowledgement information to the further wireless communication device.

In some scenarios, the alignment of step 1220 may involve that the wireless communication device receives configuration information from a node of the wireless communication network, e.g., from an access node serving the wireless communication device or an access node serving the further wireless communication device, and determines at least a part of the DRX configuration based on the configuration information received from the node of the wireless communication network, e.g., like with the configuration information 801, 912, or 1001.

In some scenarios, the alignment of step 1220 may involve that the wireless communication device receives configuration information configuration information from a node of the wireless communication network, e.g., from an access node serving the wireless communication device or an access node serving the further wireless communication device, and based on the received configuration information, determines a DRX configuration for DL or UL communication with the wireless communication network, e.g., like with the configuration information 801, 1001.

In some scenarios, the alignment of step 1220 may involve that in response to receiving the configuration information, the wireless communication device sends acknowledgement information indicating whether the received configuration information is accepted.

In each of the above examples using configuration information, the configuration information may indicate at least a part of the DRX configuration for D2D communication in terms of a deviation of one or more parameters of the DRX configuration from a DRX configuration for DL or UL communication with the wireless communication network. Further, the configuration information may indicate at least a part of the DRX configuration by identifying one among multiple pre-configured DRX configurations, e.g., pre-configured based on standard, operator settings, or network configuration.

At step 1230, the wireless communication device controls the at least one timer based on at least one D2D transmission between the wireless communication device and the further wireless communication device.

The at least one timer may include at least one first timer for controlling the wireless communication device to be in an active mode, e.g., in DRX active time, enabling reception of a D2D transmission while the first timer is not expired. Examples of the at least one first timer include the above-mentioned timers drx-onDurationTimerSL, drx-Inactivity-TimerSL, drx-RetransmissionTimerSL, drx-HARQ-FB-TimerSL, drx-CSIReport-TimerSL, and drx-BlindRetransmissionTimerSL.

In some scenarios, the at least one first timer may include a retransmission timer which is started in response to an incoming D2D transmission received by the wireless communication device not being successfully decoded.

In some cases, the incoming D2D transmission requires acknowledgement feedback, e.g., HARQ feedback. In such cases, an example of the retransmission timer is the above-mentioned timer drx-RetransmissionTimerSL. In such cases, step 1230 may involve that the wireless communication device starts the retransmission timer in response to expiry of a second timer in response to receiving the incoming D2D transmission, with the second timer being associated with a roundtrip time of the acknowledgement feedback. In this case, an example of the second timer is the above-mentioned timer drx-HARQ-RTT-TimerSL. The roundtrip time of the acknowledgement feedback may be defined as a time interval between sending the acknowledgement feedback and an earliest possible time of receiving a retransmission of the incoming D2D transmission or a resource grant for a retransmission of the incoming D2D transmission. In some scenarios, step 1230 may also involve that, depending on a scheduling mode associated with the incoming D2D transmission, the wireless communication device selectively decides whether to start the retransmission timer and/or second timer. For example, in the case of LTE or NR SL transmissions, different modes may be used for assigning or selecting resources for the SL transmission, denoted as "mode 1", "mode 2", "mode 3", and "mode 4". In mode 1 and mode 3, the selection of the resources for the SL transmission is assisted by the network, while in mode 2 and mode 4, the sending wireless communication device selects the resources in an autonomous manner. For certain scheduling modes, e.g., those using network assistance, acknowledgement feedback may be less important an sometimes omitted. This may be considered when selectively deciding whether to start the retransmission timer and/or second timer.

In some cases, the incoming D2D transmission may require the incoming D2D transmission does not require acknowledgement feedback. In such cases, an example of the retransmission timer is the above-mentioned timer drx-BlindRetransmissionTimerSL. In such cases, step 1230 may involve that the wireless communication device starts the retransmission timer in response to expiry of a second timer started in response to receiving the incoming D2D transmission, with the second timer being associated with a timing of an expected blind retransmission of the incoming D2D transmission. In this case, an example of the second timer is the above-mentioned timer drx-Retx-Proc-TimerSL. A duration of the second timer may depend on a time gap between subsequent reservations made by the further wireless communication device on a set of radio resources used for the D2D communication. The wireless communication device or a node of the wireless communication network, e.g., a serving access node of the wireless communication device, may determine a duration of the second timer depending on a time gap between subsequent reservations made by the further wireless communication device on a set of radio resources used for the D2D communication. A duration of the retransmission timer may be based on at least one of: control information associated with the incoming D2D transmission, a maximum duration of retransmissions associated with the incoming D2D transmission, and a maximum number of retransmissions associated with the incoming D2D transmission. The wireless communication device or a node of the wireless communication network, e.g., a serving access node of the wireless communication device, may determine the duration of the retransmission timer based on at least one of: control information associated with the incoming D2D transmission, a maximum duration of retransmissions associated with the incoming D2D transmission, and a maximum number of retransmissions associated with the incoming D2D transmission. Here, it is noted that the duration is the running time of the timer from first start or reset to expiry, not taking into account possible time intervals where the timer is paused. In some scenarios, the wireless communication device may start the retransmission timer in response to expiry of a configured time interval after receiving the incoming D2D transmission, in the N-th symbol after end of the incoming D2D transmission, with N being 1 or larger.

Further, step 1230 may involve that wireless communication device stops the retransmission timer in response to successfully decoding a retransmission associated with the incoming D2D transmission.

In some scenarios, the at least one first timer may include a feedback timer which is started in response to an outgoing D2D transmission sent by the wireless communication device requiring acknowledgement feedback from the further wireless communication device. An example of the feedback timer is the above-mentioned timer drx-HARQ-FB-TimerSL. In such cases, step 1230 may involve that the wireless communication device starts the feedback timer in response to expiry of a second timer which is started in response to sending the outgoing D2D transmission, with the second timer being associated with a roundtrip time of the acknowledgement feedback. In this case, an example of the second timer is the above-mentioned timer drx-HARQ-FB-RTT-TimerSL. A duration of this second timer based on a processing capability of the further wireless communication device or based on a periodicity of radio resources for transmission of the acknowledgement feedback. The wireless communication device or a node of the wireless communication network, e.g., a serving access node of the wireless communication device, may determine a duration of the second timer based on a processing capability of the further wireless communication device or based on a periodicity of radio resources for transmission of the acknowledgement feedback. The roundtrip time of the acknowledgement feedback may be defined as a time interval between sending the outgoing D2D transmission, in particular the end time of the outgoing D2D transmission, and an earliest possible time of receiving the acknowledgement feedback. Again, the duration is the running time of the timer from first start or reset to expiry, not taking into account possible time intervals where the timer is paused.

Further, step 1230 may involve that wireless communication device stops the feedback timer in response to successfully receiving the acknowledgement feedback for the outgoing D2D transmission.

In some scenarios, the at least one first timer may include a report timer started in response to the wireless communication device sending an outgoing D2D transmission, which triggers a measurement report from the further wireless communication device. An example of the report timer is the above-mentioned timer drx-CSIReport-TimerSL. In such cases, step 1230 may involve that the wireless communication device starts the report timer in response to expiry of a second timer, which started in response to sending the outgoing D2D transmission, with the second timer being associated with a roundtrip time of the measurement report. In this case, an example of the second timer is the above-mentioned timer drx-CSIReport-RTT-TimerSL. The roundtrip time of the measurement report may be defined as a time interval between sending the outgoing D2D transmission, in particular the end time of the outgoing D2D transmission, and an earliest possible time of receiving the measurement report.

Further, step 1230 may involve that wireless communication device stops the report timer in response to successfully receiving the measurement report.

At step 1240, the wireless communication device receives at least one D2D transmission from the further wireless communication device. For example, the wireless communication device may receive the at least one D2D transmission during a DRX active time, and switching to or from the DRX active time may be controlled based on the at least one timer.

Figure 13:
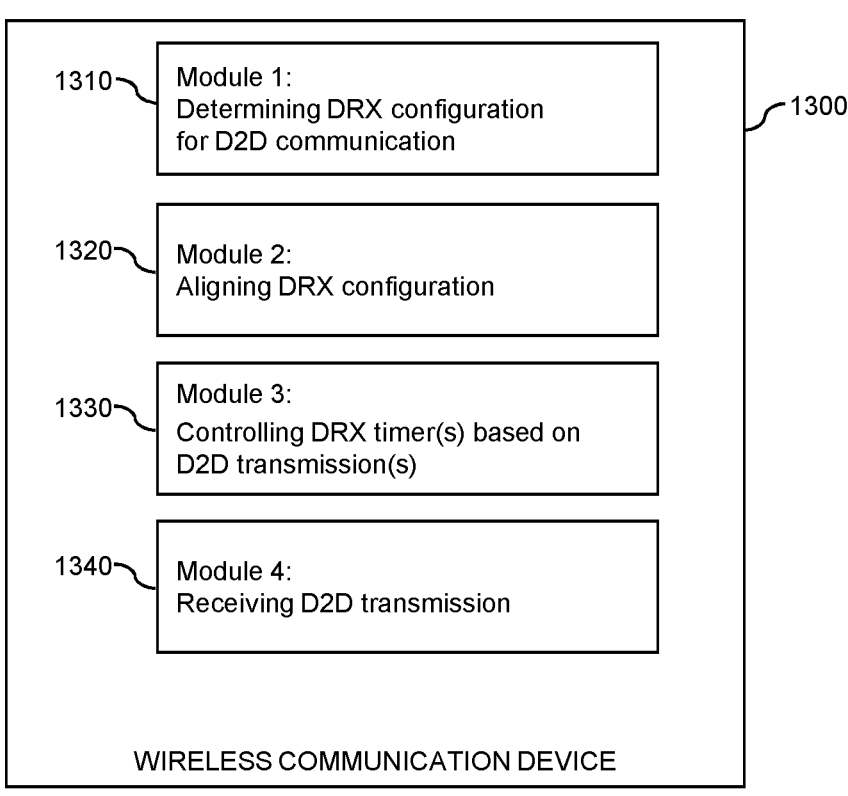
FIG. 13 shows an exemplary block diagram for illustrating functionalities of a wireless communication device implementing functionalities corresponding to the method of FIG. 12.

FIG. 13 shows a block diagram for illustrating functionalities of a wireless communication device 1300 which operates according to the method of FIG. 12. The wireless communication device 1300 may for example correspond to any of the above-mentioned UEs. As illustrated, the wireless communication device 1300 may be provided with a module 1310 configured to determine a DRX configuration for D2D communication with a further wireless communication device, such as explained in connection with step 1210. Further, the wireless communication device 1300 device may be provided with a module 1320 configured to align the DRX configuration with the further wireless communication device, such as explained in connection with step 1220. Further, the wireless communication device 1300 may be provided with a module 1330 configured to control at least one timer of the DRX configuration based on D2D transmissions, such as explained in connection with step 1230. Further, the wireless communication device 1300 may be provided with a module 1340 configured to receive at least one D2D transmission, such as explained in connection with step 1240.

It is noted that the wireless communication device 1300 may include further modules for implementing other functionalities, such as known functionalities of a UE in the LTE and/or NR radio technology. Further, it is noted that the modules of the wireless communication device 1300 do not necessarily represent a hardware structure of the wireless communication device 1300, but may also correspond to functional elements, e.g., implemented by hardware, software, or a combination thereof.

Figure 14:
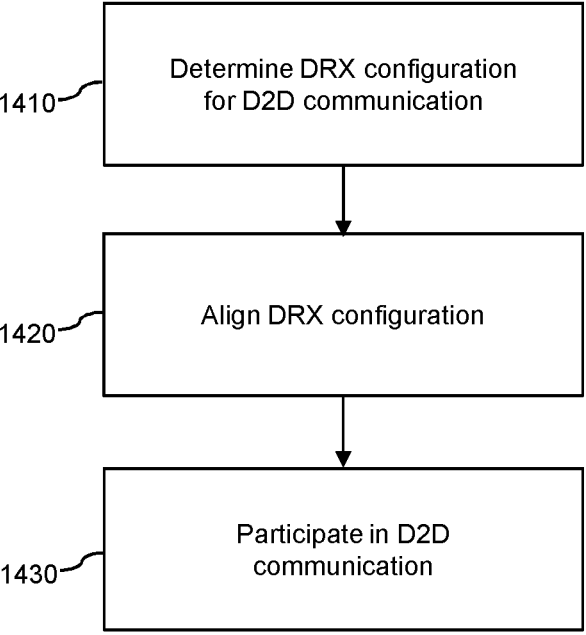
FIG. 14 shows a flowchart for schematically illustrating a further method according to an embodiment of the invention.

FIG. 14 shows a flowchart for illustrating a method, which may be utilized for implementing the illustrated concepts. The method of FIG. 14 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 14 may be performed and/or controlled by one or more processors of the wireless communication device. Such wireless communication device may also include a memory storing program code for implementing at least some of the below described functionalities or steps of the method of FIG. 14.

At step 1410, the wireless communication device determines a DRX configuration for D2D communication with a further wireless communication devices. The DRX configuration is based on at least one timer maintained by the wireless communication device. The D2D communication may for example correspond to SL communication via the PC5 interface of the LTE technology or of the NR technology. The DRX configuration may for example correspond to the above-mentioned SL DRX configuration to be applied by the RX UE. The D2D communication may involve that the wireless communication device receives at least one D2D communication from the further wireless communication device. Alternatively or in addition, the D2D communication may involve that the wireless communication device sends at least one D2D transmission to the further wireless communication device.

The wireless communication device may determine at least a part of the DRX configuration based on a DRX configuration for DL or UL communication with the wireless communication network. Further, the wireless communication device may determine at least a part of the DRX configuration depending on characteristics of D2D communication between the wireless communication device and the further wireless communication device, e.g., depending on whether HARQ feedback or other acknowledgement feedback is required.

At step 1420, the wireless communication device aligns the DRX configuration with the further wireless communication device. For receiving D2D transmissions from the further wireless communication device, the alignment of step 1420 may cause the further wireless communication device to refrain from sending a D2D transmission to the wireless communication device while, according to the aligned DRX configuration, the wireless communication device is not in an active mode enabling reception of the D2D transmission, e.g., not in DRX active time. For sending D2D transmissions to the further wireless communication device, the alignment of step 1430 may cause the wireless communication device to refrain from sending a D2D transmission to the wireless communication device while, according to the aligned DRX configuration, the further wireless communication device is not in an active mode enabling reception of the D2D transmission, e.g., not in DRX active time. The alignment of step 1420 may for example be performed with respect to a duration of at least one timer and/or parameters for deriving a duration of at least one timer.

The alignment of step 1420 may involve that the wireless communication device determines configuration information for at least a part of the DRX configuration and indicates the determined configuration information to the further wireless communication device. For example, this may be accomplished by sending configuration information, e.g., like the configuration information 802 in the example of FIG. 8A. In some scenarios, the wireless communication devices may indicates the determined configuration information by a D2D transmission to the further wireless communication device. The configuration information could then be indicated by RRC information, MAC control information, and/or PHY layer control information conveyed by the D2D transmission to the further wireless communication device. In some scenarios, the wireless communication device could also send the configuration information indirectly, e.g., via an access node serving the wireless communication device and/or an access node serving the further wireless communication device.

In addition or as an alternative, the alignment of step 1420 may involve that the wireless communication device determines configuration information for at least a part of the DRX configuration and indicates the determined configuration information to a node of the wireless communication network to which the further wireless communication device is associated, e.g., an access node serving the further wireless communication device. This can also be accomplished indirectly via the further wireless communication device or an access node serving the wireless communication device. For example, the wireless communication device could send configuration information to the further wireless communication device, e.g., like the configuration information 802, and the further wireless communication device could then propagate this configuration information to its serving access node, e.g., like with the configuration information 803.

In addition or as an alternative, the alignment of step 1420 may involve that the wireless communication device determines configuration information for at least a part of the DRX configuration and indicates the determined configuration information to a node of the wireless communication network to which the wireless communication device is associated, e.g., an access node serving the wireless communication device, e.g., like with the configuration information 903 or 1103.

In some scenarios, the wireless communication device may determine at least a part of the configuration information based on configuration information received from a node of the wireless communication network, e.g., from an access node serving the wireless communication device, like with the configuration information 801, 814, 912, or 1001.

In some scenarios, the wireless communication device may determine at least a part of the configuration information based on a DRX configuration for DL or UL communication with the wireless communication network.

In some scenarios, the wireless communication device may determine at least a part of the configuration information based on depending on characteristics of D2D communication between the wireless communication device and the further wireless communication device, e.g., depending on whether HARQ feedback or other acknowledgement feedback is required.

In some scenarios, the alignment of step 1420 may involve that in response to indicating the determined configuration information, the wireless communication device receives acknowledgement information indicating whether the determined configuration information is accepted, e.g., like the acknowledgement 804.

In some scenarios, the alignment of step 1420 may involve that in response to indicating the determined configuration information to the node, the wireless communication device receiving acknowledgement information from the node, the acknowledgement information indicating whether the determined configuration information is accepted, and that the wireless communication device forwards the acknowledgement information to the further wireless communication device.

In some scenarios, the alignment of step 1420 may involve that in response to the acknowledgement information indicating that the determined configuration information is not accepted, the wireless communication device declares failure of a D2D link between the wireless communication device and the further wireless communication device. In some cases, the alignment of step 1420 may additionally or alternatively involve that in response to the acknowledgement information indicating that the determined configuration information is not accepted, the wireless communication device initiates release or reconfiguration of a bearer configured on a D2D link between the wireless communication device and the further wireless communication device. The latter variant may for example be useful if multiple bearers are configured on the D2D link and the not-accepted configuration information relates to only a subset of the bearers.

In some scenarios, the alignment of step 1420 may involve that the wireless communication device receives configuration information from the further wireless communication device and determines at least a part of the DRX configuration based on the configuration information received from the further wireless communication device, e.g., like with the configuration information 902, 1102.

In some scenarios, the alignment of step 1420 may involve that the wireless communication device receives configuration information from the further wireless communication device and, based on the received configuration information, determines a DRX configuration for downlink or uplink communication with the wireless communication network, e.g., like with the configuration information 1102. This configuration information may be received based on a D2D transmission received from the further wireless communication device. The received configuration information may then be indicated by RRC control information, MAC control information, and/or physical layer control information conveyed by the D2D transmission from the further wireless communication device. In some scenarios, the wireless communication device could also receive the configuration information indirectly, e.g., via an access node serving the wireless communication device and/or a serving access node of the further wireless communication device.

In some scenarios, the wireless communication device may forward at least a part of the configuration information received from the further wireless communication device to a node of the wireless communication network, e.g., a serving access node of the wireless communication device. The forwarded configuration may correspond to at least a part of the determined DRX configuration for D2D communication. The wireless communication device may then receive acknowledgement information from the node. This acknowledgement information may indicate whether the forwarded configuration information is accepted. The wireless communication device may then forward the acknowledgement information to the further wireless communication device.

In some scenarios, the alignment of step 1420 may involve that the wireless communication device receives configuration information from a node of the wireless communication network, e.g., from an access node serving the wireless communication device or an access node serving the further wireless communication device, and determines at least a part of the DRX configuration based on the configuration information received from the node of the wireless communication network, e.g., like with the configuration information 801, 912, or 1001.

In some scenarios, the alignment of step 1420 may involve that the wireless communication device receives configuration information configuration information from a node of the wireless communication network, e.g., from an access node serving the wireless communication device or an access node serving the further wireless communication device, and based on the received configuration information, determines a DRX configuration for DL or UL communication with the wireless communication network, e.g., like with the configuration information 801, 1001.

In some scenarios, the alignment of step 1420 may involve that in response to receiving the configuration information, the wireless communication device sends acknowledgement information indicating whether the received configuration information is accepted. For example, the wireless communication device may send the acknowledgement information to the further wireless communication device.

In each of the above examples using configuration information, the configuration information may indicate at least a part of the DRX configuration for D2D communication in terms of a deviation of one or more parameters of the DRX configuration from a DRX configuration for DL or UL communication with the wireless communication network. Further, the configuration information may indicate at least a part of the DRX configuration by identifying one among multiple pre-configured DRX configurations, e.g., pre-configured based on standard, operator settings, or network configuration.

The at least one timer may include at least one timer for controlling the wireless communication device to be in an active mode, e.g., in DRX active time, enabling reception of a D2D transmission while the first timer is not expired. Examples of the at least one first timer include the above-mentioned timers drx-onDurationTimerSL, drx-Inactivity-TimerSL, drx-RetransmissionTimerSL, drx-HARQ-FB-TimerSL, drx-CSIReport-TimerSL, and drx-BlindRetransmissionTimerSL.

In some scenarios, the at least one timer may include a retransmission timer which is started in response to an incoming D2D transmission received by the wireless communication device not being successfully decoded.

In some scenarios, the at least one timer may include a feedback timer which is started in response to an outgoing D2D transmission sent by the wireless communication device requiring acknowledgement feedback from the further wireless communication device.

In some scenarios, the at least one first timer may include a report timer started in response to the wireless communication device sending an outgoing D2D transmission, which triggers a measurement report from the further wireless communication device.

At step 1430, the wireless communication device participates in the D2D communication with the further wireless communication device. For example, the wireless communication device may receive at least one D2D transmission from the further wireless communication device during a DRX active time determined by the aligned DRX configuration, or the wireless communication device may send at least one D2D transmission to the further wireless communication device during a DRX active time determined by the aligned DRX configuration.

Figure 15:
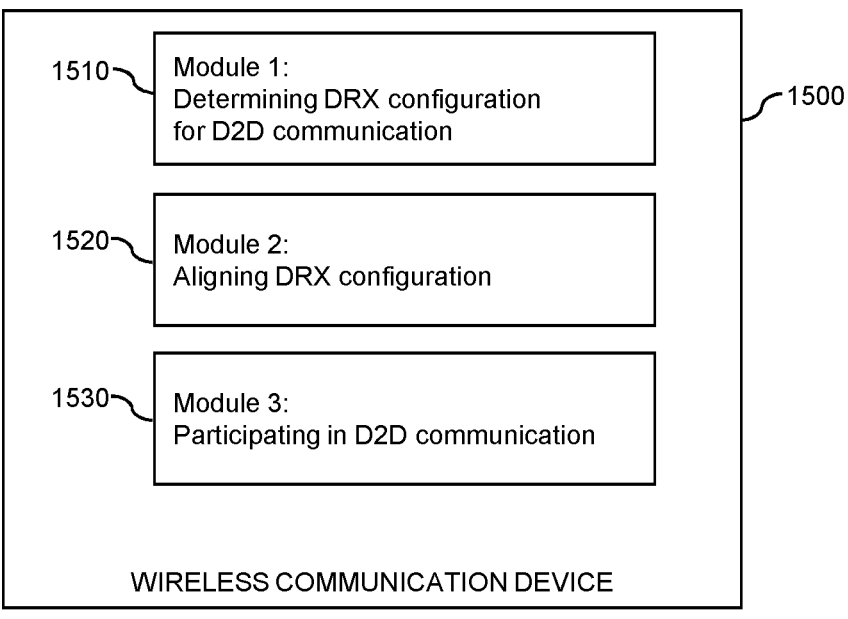
FIG. 15 shows an exemplary block diagram for illustrating functionalities of a wireless communication device implementing functionalities corresponding to the method of FIG. 14.

FIG. 15 shows a block diagram for illustrating functionalities of a wireless communication device 1300 which operates according to the method of FIG. 14. The wireless communication device 1500 may for example correspond to any of the above-mentioned UEs. As illustrated, the wireless communication device 1500 may be provided with a module 1510 configured to determine a DRX configuration for D2D communication with a further wireless communication device, such as explained in connection with step 1410. Further, the wireless communication device 1500 device may be provided with a module 1520 configured to align the DRX configuration with the further wireless communication device, such as explained in connection with step 1420. Further, the wireless communication device 1300 may be provided with a module 1530 configured to receive at least one D2D transmission or send at least one D2D transmission, such as explained in connection with step 1440.

It is noted that the wireless communication device 1500 may include further modules for implementing other functionalities, such as known functionalities of a UE in the LTE and/or NR radio technology. Further, it is noted that the modules of the wireless communication device 1500 do not necessarily represent a hardware structure of the wireless communication device 1500, but may also correspond to functional elements, e.g., implemented by hardware, software, or a combination thereof.

Figure 16:
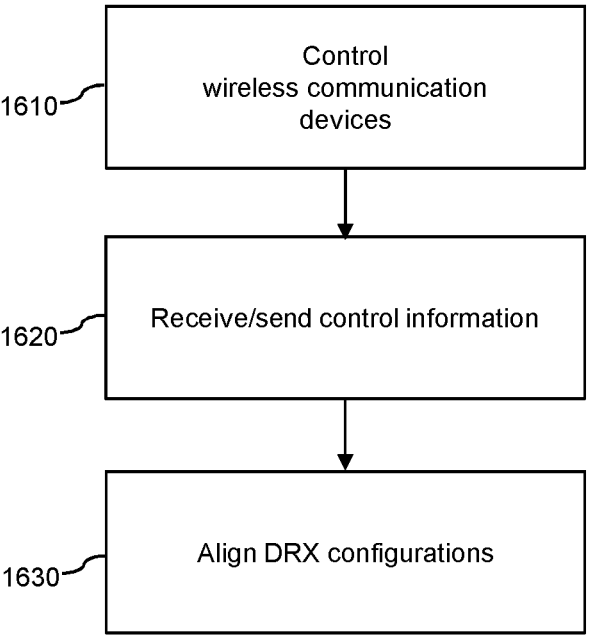
FIG. 16 shows a flowchart for schematically illustrating a further method according to an embodiment of the invention.

FIG. 16 shows a flowchart for illustrating a method, which may be utilized for implementing the illustrated concepts. The method of FIG. 16 may be used for implementing the illustrated concepts in a node of a wireless communication network, e.g., corresponding to any of the above-mentioned access nodes.

If a processor-based implementation of the node is used, at least some of the steps of the method of FIG. 16 may be performed and/or controlled by one or more processors of the node. Such node may also include a memory storing program code for implementing at least some of the below described functionalities or steps of the method of FIG. 16.

At step 1610, the node may control at least one of a first wireless communication device and a second wireless communication device. In some scenarios, the wireless communication devices may each be a vehicle or vehicle-mounted device, but other types of WD, e.g., as mentioned above, could be used as well. The node may be an access node serving at least one of the first wireless communication device and the second wireless communication device.

At step 1620, the node may receive or send control information. The node may receive the control information from another node of the wireless communication network, e.g., like with the control information 811, 911. Further, the node may receive the control from the first and/or second wireless communication device, e.g., like with the control information 803, 903, 1103. The node may send the control information to another node of the wireless communication network, e.g., like with the control information 811, 911. Further, the node may send the control to the first and/or second wireless communication device, e.g., like with the control information 801, 812, 814, 912, 914, 1001.

At step 1630, the node aligns the first wireless communication device and the second wireless communication device with respect to a DRX configuration for D2D communication between the first wireless communication device and the second wireless communication device. The D2D communication may for example correspond to SL communication via the PC5 interface of the LTE technology or of the NR technology. The DRX configuration may for example correspond to the above-mentioned SL DRX configuration to be applied by the RX UE. The D2D communication may involve that one of the first and second wireless communication devices receives at least one D2D communication sent by the other of the first and second wireless communication devices.

The alignment of step 1630 may be based on the configuration information received or sent at step 1620. The alignment of step 1630 may cause one of the first wireless communication device and the second wireless communication device to refrain from sending a D2D transmission to the other of the first wireless communication device and the second wireless communication device while, according to the aligned DRX configurations, the other wireless communication device is not in an active mode enabling reception of the D2D transmission, e.g., not in DRX active time.

The alignment of step 1630 may for example be performed with respect to a duration of at least one timer and/or parameters for deriving a duration of at least one timer. The at least one timer may include at least one timer for controlling the wireless communication device to be in an active mode, e.g., in DRX active time, enabling reception of a D2D transmission while the first timer is not expired. Examples of the at least one first timer include the above-mentioned timers drx-onDurationTimerSL, drx-Inactivity-TimerSL, drx-RetransmissionTimerSL, drx-HARQ-FB-TimerSL, drx-CSIReport-TimerSL, and drx-BlindRetransmissionTimerSL. In some scenarios, the at least one timer may include a retransmission timer which is started in response to an incoming D2D transmission received by the wireless communication device not being successfully decoded. In some scenarios, the at least one timer may include a feedback timer which is started in response to an outgoing D2D transmission sent by the wireless communication device requiring acknowledgement feedback from the further wireless communication device. In some scenarios, the at least one first timer may include a report timer started in response to the wireless communication device sending an outgoing D2D transmission, which triggers a measurement report from the further wireless communication device.

The alignment of step 1630 may involve that the node determines configuration information for at least a part of the DRX configuration and indicates the determined configuration information to the first wireless communication device and/or the second wireless communication device. Alternatively or in addition, the node may determine configuration information for at least a part of the DRX configuration and indicate the determined configuration information to at least one further node of the wireless communication network. The node may determine at least a part of the configuration information based on configuration information received from at least one of the first wireless communication device and the second wireless communication device, or on configuration information received from a further node of the wireless communication network. Accordingly, the node could also forward configuration information from one wireless communication device to the other, or could forward received configuration information to another node.

Further, the alignment of step 1630 may involve that, in response to receiving the configuration information from the at least one of the first wireless communication device and the second wireless communication device, the node sends acknowledgement information indicating whether the received configuration information is accepted.

Further, the alignment of step 1630 may involve that the node determines at least a part of the configuration information based on a DRX configuration for DL or UL communication with at least one of the first wireless communication device and the second wireless communication device.

Further, the alignment of step 1630 may involve that the node determines at least a part of the configuration information depending on characteristics of D2D communication between the first wireless communication device and the second wireless communication device, e.g., depending on whether HARQ feedback or other acknowledgement feedback is required.

Further, the alignment of step 1630 may involve that, in response to said indicating the determined configuration information, the node receives acknowledgement information indicating whether the determined configuration information is accepted.

Further, the alignment of step 1630 may involve that, in response to the acknowledgement information indicating that the determined configuration information is not accepted, the node declares failure of a D2D link between the first wireless communication device and the second wireless communication device. In some cases, the alignment of step 1630 may additionally or alternatively involve that in response to the acknowledgement information indicating that the determined configuration information is not accepted, the node initiates release or reconfiguration of a bearer configured on a D2D link between the wireless communication device and the further wireless communication device. The latter variant may for example be useful if multiple bearers are configured on the D2D link and the not-accepted configuration information relates to only a subset of the bearers.

The configuration information may indicate at least a part of the DRX configuration in terms of a deviation of one or more parameters of the DRX configuration from a DRX configuration for downlink or uplink communication with at least one of the wireless communication device and the second wireless communication device. Further, the configuration information may indicates at least a part of the DRX configuration by identifying one among multiple preconfigured DRX configurations.

Further, the alignment of step 1630 may involve that the node receives configuration information for at least a part of the DRX configurations from at least one of the first wireless communication device or the second wireless communication device, based on the received configuration information, determines a DRX configuration for DL or UL communication with at least one of the first wireless communication device and the second wireless communication device.

Figure 17:
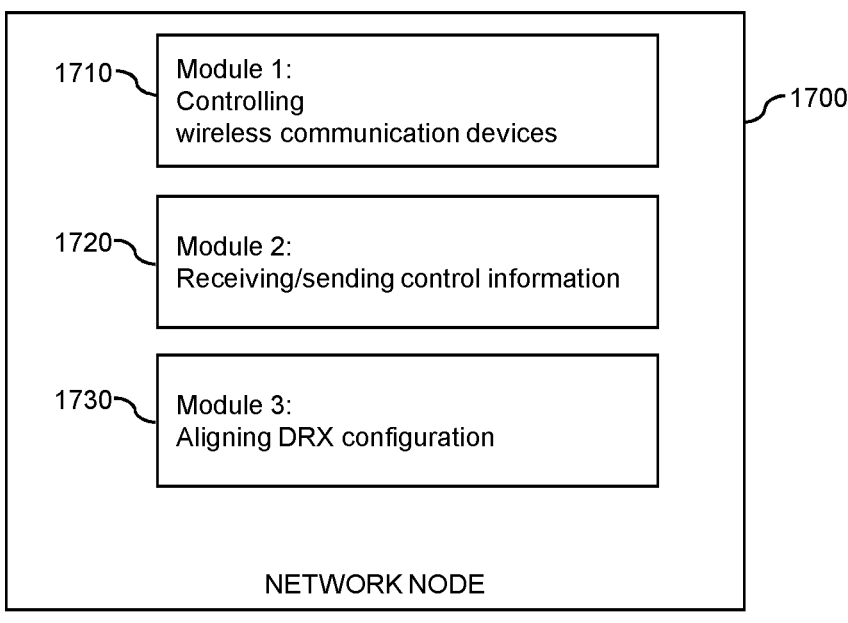
FIG. 17 shows an exemplary block diagram for illustrating functionalities of a network node implementing functionalities corresponding to the method of FIG. 16.

FIG. 17 shows a block diagram for illustrating functionalities of node 1700 for a wireless communication network which operates according to the method of FIG. 16. The node 1700 may for example correspond to any of the above-mentioned access nodes. As illustrated, the node 1700 may be provided with a module 1710 configured to control wireless communication devices, such as explained in connection with step 1610. Further, the node 1700 may be provided with a module 1720 configured to receive or send control information, such as explained in connection with step 1620. Further, the node 1700 may be provided with a module 1730 configured to align wireless communication devices with respect to a DRX configuration for D2D communication, such as explained in connection with step 1640.

It is noted that the node 1700 may include further modules for implementing other functionalities, such as known functionalities of a eNB in the LTE technology and/or a gNB in the NR technology. Further, it is noted that the modules of the node 1700 do not necessarily represent a hardware structure of the node 1700, but may also correspond to functional elements, e.g., implemented by hardware, software, or a combination thereof.

It is to be understood that the functionalities as described in connection with FIGS. 12 to 17 may also be combined in various ways, e.g., in a system which includes two or more of a wireless communication device operating according to the method of FIG. 12, a wireless communication device operating according to the method of FIG. 14, and a node operating according to the method of FIG. 16. Further, the same wireless communication device could implement functionalities corresponding to the steps of the method of FIG. 12 and the method of FIG. 14.

Figure 18:
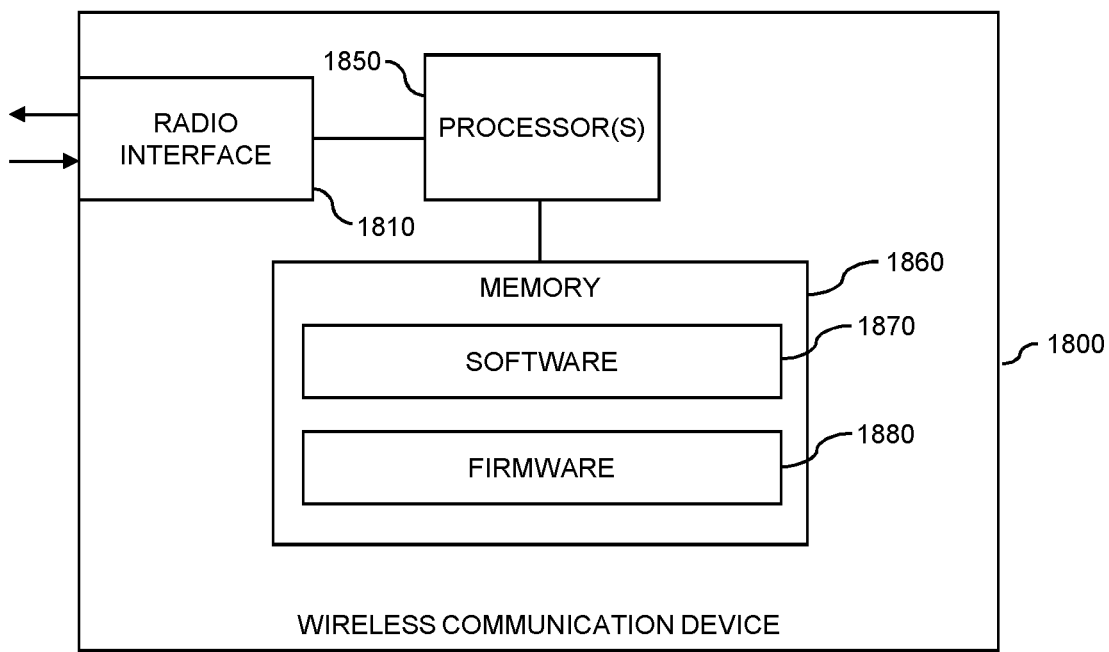
FIG. 18 schematically illustrates structures of a wireless communication device according to an embodiment of the invention.

FIG. 18 illustrates a processor-based implementation of a wireless communication device 1800 which may be used for implementing the above-described concepts. For example, the structures as illustrated in FIG. 18 may be used for implementing the concepts in any of the above-mentioned UEs.

As illustrated, the wireless communication device 1800 includes one or more radio interfaces 1810. The radio interface(s) 1810 may for example be based on the NR technology or the LTE technology. The radio interface(s) 1810 may support D2D communication, e.g., using SL communication as specified for the NR technology or the LTE technology.

Further, the wireless communication device 1800 may include one or more processors 1850 coupled to the radio interface(s) 1810 and a memory 1860 coupled to the processor(s) 1850. By way of example, the radio interface(s) 1810, the processor(s) 1850, and the memory 1860 could be coupled by one or more internal bus systems of the wireless communication device 1800. The memory 1860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1860 may include software 1870 and/or firmware 1880. The memory 1860 may include suitably configured program code to be executed by the processor(s) 1850 so as to implement the above-described functionalities for controlling D2D communication, such as explained in connection with FIGS. 12 to 15.

It is to be understood that the structures as illustrated in FIG. 18 are merely schematic and that the wireless communication device 1800 may actually include further components which, for the sake of clarity, have not been illustrated, e.g., further interfaces, such as a dedicated management interface, or further processors. Also, it is to be understood that the memory 1860 may include further program code for implementing known functionalities of a UE. According to some embodiments, also a computer program may be provided for implementing functionalities of the wireless communication device 1800, e.g., in the form of a physical medium storing the program code and/or other data to be stored in the memory 1860 or by making the program code available for download or by streaming.

Figure 19:
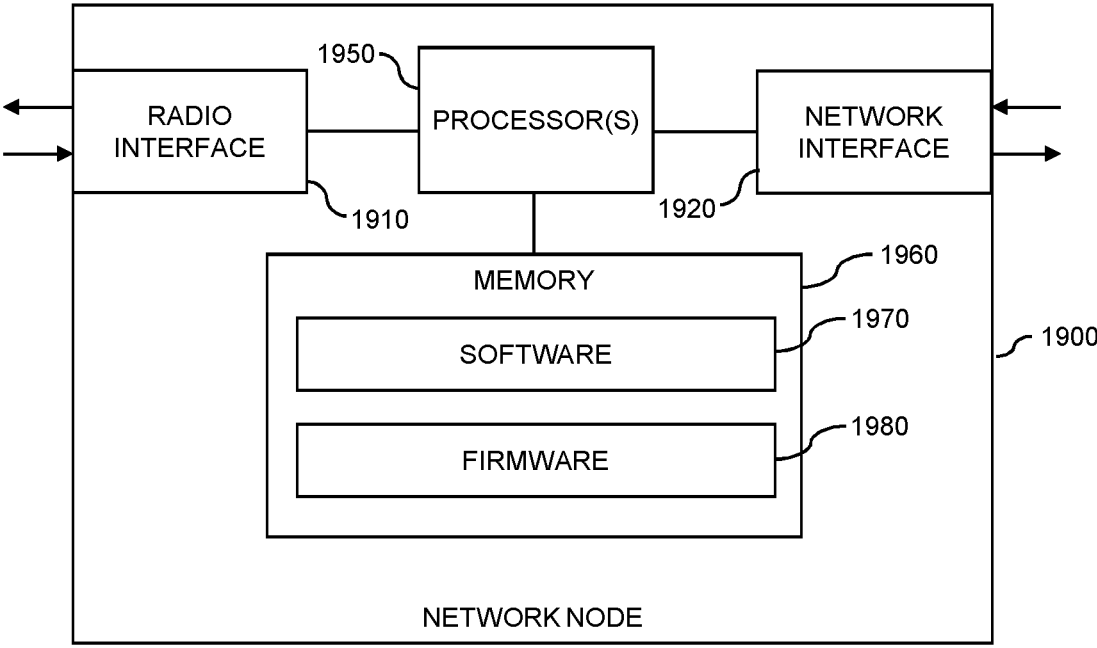
FIG. 19 schematically illustrates structures of a network node according to an embodiment of the invention.

FIG. 19 illustrates a processor-based implementation of a node 1900 for a wireless communication network, which may be used for implementing the above-described concepts. For example, the structures as illustrated in FIG. 19 may be used for implementing the concepts in any of the above-mentioned access nodes.

As illustrated, the node 1900 may include one or more radio interfaces 1910. The radio interface(s) 1910 may for example be based on the NR technology or the LTE technology. The radio interface(s) 1910 may be used for controlling wireless communication devices, such as any of the above-mentioned UEs. In addition, the node 1900 may include one or more network interfaces 1920. The network interface(s) 1920 may for example be used for communication with one or more other nodes of the wireless communication network. Also the network interface(s) 1920 may be used for controlling wireless communication devices, such as any of the above-mentioned UEs.

Further, the node 1900 may include one or more processors 1950 coupled to the interface(s) 1910, 1920 and a memory 1960 coupled to the processor(s) 1950. By way of example, the interface(s) 1910, the processor(s) 1950, and the memory 1960 could be coupled by one or more internal bus systems of the node 1900. The memory 1960 may include a ROM, e.g., a flash ROM, a RAM, e.g., a DRAM or SRAM, a mass storage, e.g., a hard disk or solid state disk, or the like. As illustrated, the memory 1960 may include software 1970 and/or firmware 1980. The memory 1960 may include suitably configured program code to be executed by the processor(s) 1950 so as to implement the above-described functionalities for controlling D2D communication, such as explained in connection with FIGS. 16 and 17.

It is to be understood that the structures as illustrated in FIG. 19 are merely schematic and that the node 1900 may actually include further components which, for the sake of clarity, have not been illustrated, e.g., further interfaces, such as a dedicated management interface, or further processors. Also, it is to be understood that the memory 1960 may include further program code for implementing known functionalities of an eNB or of a gNB. According to some embodiments, also a computer program may be provided for implementing functionalities of the node 1900, e.g., in the form of a physical medium storing the program code and/or other data to be stored in the memory 1960 or by making the program code available for download or by streaming.

As can be seen, the concepts as described above may be used for performing D2D communication in an energy efficient manner. In particular, the concepts may be used for SL UEs are configured to wake-up for DRX operation considering SL transmission and reception characteristics, such as expected HARQ feedback transmission, data retransmission, and CSI report transmission. Further, based on the signaling procedures and mechanisms illustrated herein, SL DRX configurations can be properly configured and aligned between peer UEs engaged in SL communication. Further, it may also be possible to align the SL DRX configuration and DL/UL DRX configuration of a UE. This may enable highly efficient management of the battery consumption, because the UE can turn off at least a part of its received circuitry when no transmissions and receptions are expected.

It is to be understood that the examples and embodiments as explained above are merely illustrative and susceptible to various modifications. For example, the illustrated concepts may be applied in connection with various kinds of radio technologies and D2D communication, without limitation the SL mode of the LTE technology or NR technology, e.g., in connection with WLAN technologies or other wireless ad-hoc network technologies. Further, the concepts may be applied with respect to various types of UEs, without limitation to vehicle-based UEs. Further, the concepts may be applied in connection with various services supported by D2D communication, without limitation to V2X, NSPS, or NCIS. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling device-to-device, D2D, communication, the method comprising:
a wireless communication device (10; 1300; 1800) determining a Discontinuous Reception, DRX, configuration for D2D communication, the DRX configuration being based on at least one timer maintained by the wireless communication device (10; 1300; 1800);
the wireless communication device controlling the at least one timer based on at least one D2D transmission between the wireless communication device (10; 1300; 1800) and a further wireless communication device (10; 1300; 1500; 1800); and
based on the DRX configuration, the wireless communication device (10; 1300; 1800) receiving at least one D2D transmission from the further wireless communication device (10; 1300; 1500; 1800).

Embodiment 2

The method according to embodiment 1, comprising:
wherein the at least one timer comprises at least one first timer for controlling the wireless communication device (10; 1300; 1800) to be in an active mode enabling reception of a D2D transmission while the first timer is not expired.

Embodiment 3

The method according to embodiment 2, comprising:
wherein the at least one first timer comprises a retransmission timer which is started in response to an incoming D2D transmission received by the wireless communication device (10; 1300; 1800) not being successfully decoded.

Embodiment 4

The method according to embodiment 3,
wherein the incoming D2D transmission requires acknowledgement feedback.

Embodiment 5

The method according to embodiment 4, comprising:
the wireless communication device (10; 1300; 1800) starting the retransmission timer in response to expiry of a second timer in response to receiving the incoming D2D transmission, the second timer being associated with a roundtrip time of the acknowledgement feedback.

Embodiment 6

The method according to embodiment 4 or 5, comprising:
depending on a scheduling mode associated with the incoming D2D transmission, the wireless communication device (10; 1300; 1800) selectively deciding whether to start the retransmission timer.

Embodiment 7

The method according to embodiment 3,
wherein the incoming D2D transmission does not require acknowledgement feedback.

Embodiment 8

The method according to embodiment 7, comprising:
the wireless communication device (10; 1300; 1800) starting the retransmission timer in response to expiry of a second timer started in response to receiving the incoming D2D transmission, the second timer being associated with a timing of an expected blind retransmission of the incoming D2D transmission.

Embodiment 9

The method according to embodiment 8, comprising:
the wireless communication device (10; 1300; 1800) determining a duration of the second timer depending on a time gap between subsequent reservations made by the further wireless communication device (10; 1300; 1500; 1800) on a set of radio resources used for the D2D communication.

Embodiment 10

The method according to embodiment 7, comprising:
the wireless communication device starting the retransmission timer in response to expiry of a configured time interval after receiving the incoming D2D transmission.

Embodiment 11

The method according to any one of embodiments 7 to 10, comprising:
the wireless communication device (10; 1300; 1800) determining a duration of the retransmission timer based on at least one of: control information associated with the incoming D2D transmission, a maximum duration of retransmissions associated with the incoming D2D transmission, and a maximum number of retransmissions associated with the incoming D2D transmission.

Embodiment 12

The method according to any one of embodiments 4 to 11, comprising:
the wireless communication device (10; 1300; 1800) stopping the retransmission timer in response to successfully decoding a retransmission associated with the incoming D2D transmission.

Embodiment 13

The method according to any one of embodiments 2 to 12,
wherein the at least one first timer comprises a feedback timer which is started in response to an outgoing D2D transmission sent by the wireless communication device (10; 1300; 1800) requiring acknowledgement feedback from the further wireless communication device.

Embodiment 14

The method according to embodiment 13, comprising:
the wireless communication device starting the feedback timer in response to expiry of a second timer started in response to sending the outgoing D2D transmission, the second timer being associated with a roundtrip time of the acknowledgement feedback.

Embodiment 15

The method according to embodiment 13 or 14, comprising:
the wireless communication device (10; 1300; 1800) determining a duration of the second timer based on a processing capability of the further wireless communication device (10; 1300; 1500; 1800).

Embodiment 16

The method according to any one of embodiments 13 to 15, comprising:
the wireless communication device (10; 1300; 1800) determining a duration of the second timer based on a periodicity of radio resources for transmission of the acknowledgement feedback.

Embodiment 17

The method according to any one of embodiments 13 to 16, comprising the wireless communication device (10; 1300; 1800) stopping the feedback timer in response to successfully receiving the acknowledgement feedback for the outgoing D2D transmission.

Embodiment 18

The method according to any of the embodiments 2 to 17, wherein the at least one first timer comprises a report timer started in response to the wireless communication device (10; 1300; 1800) sending an outgoing D2D transmission which triggers a measurement report from the further wireless communication device (10; 1300; 1500; 1800).

Embodiment 19

The method according to embodiment 18, comprising:

the wireless communication device (10; 1300; 1800) starting the report timer in response to expiry of a second timer started in response to sending the outgoing D2D transmission, the second timer being associated with a roundtrip time of the measurement report.

Embodiment 20

The method according to embodiment 18 or 19, comprising the wireless communication device (10; 1300; 1800) stopping the report timer in response to successfully receiving the measurement report.

Embodiment 21

The method according to any one of embodiments 1 to 20, comprising:

the wireless communication device (10; 1300; 1800) aligning the DRX configuration with the further wireless communication device (10; 1300; 1500; 1800).

Embodiment 22

The method according to embodiment 21, wherein said aligning of the DRX configuration comprises:

the wireless communication device (10; 1300; 1800) determining configuration information for at least a part of the DRX configuration; and the wireless communication device indicating the determined configuration information to the further wireless communication device (10; 1300; 1500; 1800).

Embodiment 23

The method according to embodiment 22, wherein the wireless communication devices indicates the determined configuration information by a D2D transmission to the further wireless communication device (10; 1300; 1500; 1800).

Embodiment 24

The method according to embodiment 23, wherein the determined configuration information is indicated by Radio Resource Control, RRC, information, Medium Access Control, MAC, control information, and/or physical layer control information conveyed by the D2D transmission to the further wireless communication device (10; 1300; 1500; 1800).

Embodiment 25

The method according to embodiment 21 to 24, wherein said aligning of the DRX configuration comprises:

the wireless communication device (10; 1300; 1800) determining configuration information for at least a part of the DRX configuration; and the wireless communication device (10; 1300; 1800) indicating the determined configuration information to a node (100; 1700; 1900) of the wireless communication network to which the further wireless communication device is associated.

Embodiment 26

The method according to embodiment 25, wherein the node (100; 1700; 1900) to which the further wireless communication device (10; 1300; 1500; 1800) is associated is an access node serving the further wireless communication device (10; 1300; 1500; 1800).

Embodiment 27

The method according to any one of embodiments 21 to 26, wherein said aligning of the DRX configuration comprises:

the wireless communication device (10; 1300; 1800) determining configuration information for at least a part of the DRX configuration; and the wireless communication device (10; 1300; 1800) indicating the determined configuration information to a node (100; 1700; 1900) of the wireless communication network to which the wireless communication device (10; 1300; 1800) is associated.

Embodiment 28

The method according to embodiment 27, wherein the node (100; 1700; 1900) to which the wireless communication device (10; 1300; 1800) is associated is an access node serving the wireless communication device (10; 1300; 1800).

Embodiment 29

The method according to any one of embodiments 22 to 28, wherein the wireless communication device (10; 1300; 1800) determines at least a part of the configuration information based on configuration information received from a node (100; 1700; 1900) of the wireless communication network.

Embodiment 30

The method according to any one of embodiments 22 to 29, wherein the wireless communication device (10; 1300; 1800) determines at least a part of the configuration information based on a DRX configuration for downlink or uplink communication with the wireless communication network.

Embodiment 31

The method according to any one of embodiments 22 to 30, wherein the wireless communication device (10; 1300; 1800) determines at least a part of the configuration information depending on characteristics of D2D communication between the wireless communication device (10; 1300; 1800) and the further wireless communication device (10; 1300; 1500; 1800).

Embodiment 32

The method according to any one of embodiments 22 to 31, comprising:

in response to said indicating the determined configuration information, the wireless communication device (10; 1300; 1800) receiving acknowledgement information indicating whether the determined configuration information is accepted.

Embodiment 33

The method according to embodiment 32, comprising:

in response to the acknowledgement information indicating that the determined configuration information is not accepted, the wireless communication device (10; 1300; 1800) declaring failure of a D2D link between the wireless communication device (10; 1300; 1800) and the further wireless communication device (10; 1300; 1500; 1800) or the wireless communication device (10; 1300; 1800) initiating release or reconfiguration of a bearer configured on a D2D link between the wireless communication device (10; 1300; 1800) and the further wireless communication device (10; 1300; 1500; 1800).

Embodiment 34

The method according to any one of embodiments 21 to 33, wherein said aligning of the DRX configuration comprises:

the wireless communication device (10; 1300; 1800) receiving configuration information from the further wireless communication device (10; 1300; 1500; 1800); and the wireless communication device (10; 1300; 1800) determining at least a part of the DRX configuration based on the configuration information received from the further wireless communication device (10; 1300; 1500; 1800).

Embodiment 35

The method according to any one of embodiments 21 to 34, wherein said aligning of the DRX configuration comprises:

the wireless communication device (10; 1300; 1800) receiving configuration information from the further wireless communication device (10; 1300; 1500; 1800); and based on the received configuration information, the wireless communication device (10; 1300; 1800) determining a DRX configuration for downlink or uplink communication with the wireless communication network.

Embodiment 36

The method according to embodiment 34 or 35, wherein said receiving the configuration information from the further wireless communication device (10; 1300; 1500; 1800) is based on a D2D transmission received from the further wireless communication device.

Embodiment 37

The method according to embodiment 36, wherein the received configuration information is indicated by RRC control information, MAC control information, and/or physical layer control information conveyed by the D2D transmission from the further wireless communication device (10; 1300; 1500; 1800).

Embodiment 38

The method according to any one of embodiments 21 to 37, wherein said aligning of the DRX configuration comprises:

the wireless communication device (10; 1300; 1800) receiving configuration information from a node (100; 1700; 1900) of the wireless communication network; and the wireless communication device (10; 1300; 1800) determining at least a part of the DRX configuration based on the configuration information received from the node (100; 1700; 1900) of the wireless communication network.

Embodiment 39

The method according to any one of embodiments 21 to 38, wherein said aligning of the DRX configuration comprises:

the wireless communication device (10; 1300; 1800) receiving configuration information from a node (100; 1700; 1900) of the wireless communication network; and based on the received configuration information, the wireless communication device (10; 1300; 1800) determining a DRX configuration for downlink or uplink communication with the wireless communication network.

Embodiment 40

The method according to embodiment 38 or 39,
wherein the node (100; 1700; 1900) from which the
configuration information is received is an access node
serving the wireless communication device (10; 1300;
1800).

Embodiment 41

The method according to any one of embodiments 38 to
40,
wherein the node (100; 1700; 1900) from which the
configuration information is received is an access node
serving the further wireless communication device (10;
1300; 1500; 1800).

Embodiment 42

The method according to any one of embodiments 34 to
41, comprising:
in response to receiving the configuration information, the
wireless communication device (10; 1300; 1800) send-
ing acknowledgement information indicating whether
the received configuration information is accepted.

Embodiment 43

The method according to any one of embodiments 22 to
42,
wherein the configuration information indicates at least a
part of the DRX configuration in terms of a deviation
of one or more parameters of the DRX configuration
from a DRX configuration for downlink or uplink
communication with the wireless communication net-
work.

Embodiment 44

The method according to any one of embodiments 22 to
44,
wherein the configuration information indicates at least a
part of the DRX configuration by identifying one
among multiple pre-configured DRX configurations.

Embodiment 45

The method according to any one of embodiments 21 to
44,
wherein said aligning of the DRX configuration com-
prises:
the wireless communication device (10; 1300; 1800)
determining at least a part of the DRX configuration
based on a DRX configuration for downlink or uplink
communication with the wireless communication net-
work.

Embodiment 46

The method according to any one of embodiments 21 to
45,
wherein the wireless communication device (10; 1300;
1800) determines at least a part of the DRX configu-
ration depending on characteristics of D2D communi-
cation between the wireless communication device (10;

1300; 1800) and the further wireless communication
device (10; 1300; 1500; 1800).

Embodiment 47

The method according to any one of embodiments 21 to
46,
wherein said aligning of the DRX configuration causes
the further wireless communication device (10; 1300;
1500; 1800) to refrain from sending a D2D transmis-
sion to the wireless communication device (10; 1300;
1800) while, according to the aligned DRX configura-
tion, the wireless communication device (10; 1300;
1800) is not in an active mode enabling reception of the
D2D transmission.

Embodiment 48

The method according to any one of embodiments 21 to
47,
wherein the DRX configuration is aligned with respect to
a duration of the at least one timer and/or parameters
for deriving a duration of the at least one timer.

Embodiment 49

A method of controlling device-to-device, D2D, commu-
nication, the method comprising:
a wireless communication device (10; 1300; 1500; 1800)
determining a Discontinuous Reception, DRX, con-
figuration for D2D communication;
the wireless communication device (10; 1300; 1500;
1800) aligning the DRX configuration with a further
wireless communication device (10; 1300; 1500;
1800); and
based on the DRX configuration, the wireless communi-
cation device (10; 1300; 1500; 1800) participating in
D2D communication with the further wireless commu-
nication device (10; 1300; 1500; 1800).

Embodiment 50

The method according to embodiment 49,
wherein said aligning of the DRX configuration com-
prises:
the wireless communication device (10; 1300; 1500;
1800) determining configuration information for at
least a part of the DRX configuration; and
the wireless communication device (10; 1300; 1500;
1800) indicating the determined configuration informa-
tion to the further wireless communication device (10;
1300; 1500; 1800).

Embodiment 51

The method according to embodiment 50,
wherein the wireless communication device (10; 1300;
1500; 1800) indicates the determined configuration
information by a D2D transmission to the further
wireless communication device (10; 1300; 1500;
1800).

Embodiment 52

The method according to embodiment 51,
wherein the determined configuration information is indi-
cated by Radio Resource Control, RRC, information, Medium Access Control, MAC, control information, and/or physical layer control information conveyed by the D2D transmission to the further wireless communication device (10; 1300; 1500; 1800).

Embodiment 53

The method according to embodiment 49 to 52, wherein said aligning of the DRX configuration comprises:

the wireless communication device (10; 1300; 1500; 1800) determining configuration information for at least a part of the DRX configuration; and the wireless communication device (10; 1300; 1500; 1800) indicating the determined configuration information to a node (100; 1700; 1900) of the wireless communication network to which the further wireless communication device (10; 1300; 1500; 1800) is associated.

Embodiment 54

The method according to embodiment 53, wherein the node (100; 1700; 1900) to which the further wireless communication device (10; 1300; 1500; 1800) is associated is an access node serving the further wireless communication device (10; 1300; 1500; 1800).

Embodiment 55

The method according to any one of embodiments 49 to 54, wherein said aligning of the DRX configuration comprises:

the wireless communication device (10; 1300; 1500; 1800) determining configuration information for at least a part of the DRX configuration; and the wireless communication device (10; 1300; 1500; 1800) indicating the determined configuration information to a node (100; 1700; 1900) of the wireless communication network to which the wireless communication device (10; 1300; 1500; 1800) is associated.

Embodiment 56

The method according to embodiment 55, wherein the node (100; 1700; 1900) to which the wireless communication device (10; 1300; 1500; 1800) is associated is an access node serving the wireless communication device (10; 1300; 1500; 1800).

Embodiment 57

The method according to any one of embodiments 50 to 55, wherein the wireless communication device (10; 1300; 1500; 1800) determines at least a part of the configuration information based on configuration information received from a node (100; 1700; 1900) of the wireless communication network.

Embodiment 58

The method according to any one of embodiments 50 to 57, wherein the wireless communication device (10; 1300; 1500; 1800) determines at least a part of the configuration information based on a DRX configuration for downlink or uplink communication with the wireless communication network.

Embodiment 59

The method according to any one of embodiments 50 to 58, wherein the wireless communication device (10; 1300; 1500; 1800) determines at least a part of the configuration information depending on characteristics of D2D communication between the wireless communication device (10; 1300; 1500; 1800) and the further wireless communication device (10; 1300; 1500; 1800).

Embodiment 60

The method according to any one of embodiments 49 to 57, comprising:

in response to said indicating the determined configuration information, the wireless communication device (10; 1300; 1500; 1800) receiving acknowledgement information indicating whether the determined configuration information is accepted.

Embodiment 61

The method according to embodiment 60, comprising:

in response to the acknowledgement information indicating that the determined configuration information is not accepted, the wireless communication device (10; 1300; 1500; 1800) declaring failure of a D2D link between the wireless communication device (10; 1300; 1500; 1800) and the further wireless communication device (10; 1300; 1500; 1800) or the wireless communication device (10; 1300; 1500; 1800) initiating release or reconfiguration of a bearer configured on a D2D link between the wireless communication device (10; 1300; 1500; 1800) and the further wireless communication device (10; 1300; 1500; 1800).

Embodiment 62

The method according to any one of embodiments 49 to 61, wherein said aligning of the DRX configuration comprises:

the wireless communication device (10; 1300; 1500; 1800) receiving configuration information from the further wireless communication device (10; 1300; 1500; 1800); and the wireless communication device (10; 1300; 1500; 1800) determining at least a part of the DRX configuration based on the configuration information received from the further wireless communication device (10; 1300; 1500; 1800).

Embodiment 63

The method according to any one of embodiments 49 to 62, wherein said aligning of the DRX configuration comprises:

the wireless communication device (10; 1300; 1500; 1800) receiving configuration information from the further wireless communication device (10; 1300; 1500; 1800); and based on the received configuration information, the wireless communication device (10; 1300; 1500; 1800) determining a DRX configuration for downlink or uplink communication with the wireless communication network.

Embodiment 64

The method according to embodiment 62 or 63,
wherein said receiving the configuration information from the further wireless communication device (10; 1300; 1500; 1800) is based on a D2D transmission received from the further wireless communication device (10; 1300; 1500; 1800).

Embodiment 65

The method according to embodiment 64,
wherein the received configuration information is indicated by RRC control information, MAC control information, and/or physical layer control information conveyed by the D2D transmission from the further wireless communication device (10; 1300; 1500; 1800).

Embodiment 66

The method according to any one of embodiments 49 to 65,
wherein said aligning of the DRX configuration comprises:
the wireless communication device (10; 1300; 1500; 1800) receiving configuration information from a node (100; 1700; 1900) of the wireless communication network; and
the wireless communication device (10; 1300; 1500; 1800) determining at least a part of the DRX configuration based on the configuration information received from the node (100; 1700; 1900) of the wireless communication network.

Embodiment 67

The method according to any one of embodiments 49 to 66,
wherein said aligning of the DRX configuration comprises:
the wireless communication device (10; 1300; 1500; 1800) receiving configuration information from a node (100; 1700; 1900) of the wireless communication network; and
based on the received configuration information, the wireless communication device (10; 1300; 1500; 1800) determining a DRX configuration for downlink or uplink communication with the wireless communication network.

Embodiment 68

The method according to embodiment 66 or 67,
wherein the node (100; 1700; 1900) from which the configuration information is received is an access node serving the wireless communication device (10; 1300; 1500; 1800).

54

Embodiment 69

The method according to any one of embodiments 66 to 68,
wherein the node (100; 1700; 1900) from which the configuration information is received is an access node serving the further wireless communication device (10; 1300; 1500; 1800).

Embodiment 70

The method according to any one of embodiments 63 to 69, comprising:
in response to receiving the configuration information, the wireless communication device (10; 1300; 1500; 1800) sending acknowledgement information indicating whether the received configuration information is accepted.

Embodiment 71

The method according to any one of embodiments 50 to 70,
wherein the configuration information indicates at least a part of the DRX configuration in terms of a deviation of one or more parameters of the DRX configuration from a DRX configuration for downlink or uplink communication with the wireless communication network.

Embodiment 72

The method according to any one of embodiments 50 to 71,
wherein the configuration information indicates at least a part of the DRX configuration by identifying one among multiple pre-configured DRX configurations.

Embodiment 73

The method according to any one of embodiments 49 to 72,
wherein said aligning of the DRX configuration comprises:
the wireless communication device (10; 1300; 1500; 1800) determining at least a part of the DRX configuration based on a DRX configuration for downlink or uplink communication with the wireless communication network.

Embodiment 74

The method according to any one of embodiments 49 to 73,
wherein the wireless communication device (10; 1300; 1500; 1800) determines at least a part of the DRX configuration depending on characteristics of D2D communication between the wireless communication device (10; 1300; 1500; 1800) and the further wireless communication device (10; 1300; 1500; 1800).

Embodiment 75

The method according to any one of embodiments 49 to 74,
wherein said aligning of the DRX configuration causes the further wireless communication device (10; 1300; 1500; 1800) to refrain from sending a D2D transmission to the wireless communication device (10; 1300; 1500; 1800) while, according to the aligned DRX configuration, the wireless communication device (10; 1300; 1500; 1800) is not in an active mode enabling reception of the D2D transmission, and/or causes the wireless communication device (10; 1300; 1500; 1800) to refrain from sending a D2D transmission to the further wireless communication device (10; 1300; 1500; 1800) while, according to the aligned DRX configuration, the further wireless communication device (10; 1300; 1500; 1800) is not in an active mode enabling reception of the D2D transmission.

Embodiment 76

A method of controlling device-to-device, D2D, communication, the method comprising:
a node (100; 1700; 1900) of a wireless communication network aligning a first wireless communication device (10; 1300; 1500; 1800) and a second wireless communication device with respect to a Discontinuous Reception, DRX, configuration for D2D communication between the first wireless communication device (10; 1300; 1500; 1800) and the second wireless communication device (10; 1300; 1500; 1800).

Embodiment 77

The method according to embodiment 76,
wherein said aligning comprises:
the node (100; 1700; 1900) determining configuration information for at least a part of the DRX configuration; and
the node (100; 1700; 1900) indicating the determined configuration information to at least one of the first wireless communication device (10; 1300; 1500; 1800) and the second wireless communication device.

Embodiment 78

The method according to embodiment 76 or 77,
wherein said aligning comprises:
the node (100; 1700; 1900) determining configuration information for at least a part of the DRX configuration; and
the node (100; 1700; 1900) indicating the determined configuration information to at least one further node of the wireless communication network (100; 1700; 1900).

Embodiment 79

The method according to any one of embodiments 76 to 78,
wherein the node (100; 1700; 1900) is an access node serving at least one of the first wireless communication device (10; 1300; 1500; 1800) and the second wireless communication device (10; 1300; 1500; 1800).

Embodiment 80

The method according to any one of embodiments 76 to 79,
wherein the node (100; 1700; 1900) determines at least a part of the configuration information based on configuration information received from at least one of the first wireless communication device (10; 1300; 1500; 1800) and the second wireless communication device (10; 1300; 1500; 1800).

56

Embodiment 81

The method according to embodiment 80, comprising:
in response to receiving the configuration information from the at least one of the first wireless communication device (10; 1300; 1500; 1800) and the second wireless communication device (10; 1300; 1500; 1800), the node (100; 1700; 1900) sending acknowledgement information indicating whether the received configuration information is accepted.

Embodiment 82

The method according to any one of embodiments 76 to 81,
wherein the node (100; 1700; 1900) determines at least a part of the configuration information based on a DRX configuration for downlink or uplink communication with at least one of the first wireless communication device (10; 1300; 1500; 1800) and the second wireless communication device (10; 1300; 1500; 1800).

Embodiment 83

The method according to any one of embodiments 76 to 82,
wherein the node (100; 1700; 1900) determines at least a part of the configuration information depending on characteristics of D2D communication between the first wireless communication device (10; 1300; 1500; 1800) and the second wireless communication device (10; 1300; 1500; 1800).

Embodiment 84

The method according to any one of embodiments 76 to 83, comprising:
in response to said indicating the determined configuration information, the node (100; 1700; 1900) receiving acknowledgement information indicating whether the determined configuration information is accepted.

Embodiment 85

The method according to embodiment 84, comprising:
in response to the acknowledgement information indicating that the determined configuration information is not accepted, the node (100; 1700; 1900) declaring failure of a D2D link between the first wireless communication device (10; 1300; 1500; 1800) and the second wireless communication device (10; 1300; 1500; 1800) or the node (100; 1700; 1900) initiating release or reconfiguration of a bearer configured on a D2D link between the wireless communication device (10; 1300; 1800) and the further wireless communication device (10; 1300; 1500; 1800).

Embodiment 86

The method according to any one of embodiments 76 to 85,
wherein the configuration information indicates at least a part of the DRX configuration in terms of a deviation of one or more parameters of the DRX configuration from a DRX configuration for downlink or uplink communication with at least one of the wireless communication device (10; 1300; 1500; 1800) and the second wireless communication device (10; 1300; 1500; 1800).

Embodiment 87

The method according to any one of embodiments 76 to 86, wherein said aligning comprises:

the node (100; 1700; 1900) receiving configuration information for at least a part of the DRX configurations from at least one of the first wireless communication device (10; 1300; 1500; 1800) and the second wireless communication device (10; 1300; 1500; 1800); and based on the received configuration information, the node (100; 1700; 1900) determining a DRX configuration for downlink or uplink communication with at least one of the first wireless communication device (10; 1300; 1500; 1800) and the second wireless communication device (10; 1300; 1500; 1800).

Embodiment 88

The method according to any one of embodiments 76 to 87, wherein the configuration information indicates at least a part of the DRX configuration by identifying one among multiple pre-configured DRX configurations.

Embodiment 89

The method according to any one of embodiments 76 to 88, wherein said aligning causes one of the first wireless communication device (10; 1300; 1500; 1800) and the second wireless communication device (10; 1300; 1500; 1800) to refrain from sending a D2D transmission to the other of the first wireless communication device (10; 1300; 1500; 1800) and the second wireless communication device (10; 1300; 1500; 1800) while, according to the aligned DRX configurations, the other wireless communication device (10; 1300; 1500; 1800) is not in an active mode enabling reception of the D2D transmission.

Embodiment 90

A wireless communication device (10; 1300; 1800), the wireless communication device being configured to:

determine a Discontinuous Reception, DRX, configuration for D2D communication, the DRX configuration being based on at least one timer maintained by the wireless communication device;

control the at least one timer based on at least one D2D transmission between the wireless communication device (10; 1300; 1800) and a further wireless communication device (10; 1300; 1500; 1800); and based on the DRX configuration, receive at least one D2D transmission from the further wireless communication device (10; 1300; 1500; 1800).

Embodiment 91

The wireless communication device (10; 1300; 1800) according to embodiment 90, wherein the wireless communication device (10; 1300; 1800) is configured to perform a method according to any one of embodiments 2 to 48.

Embodiment 92

The wireless communication device (10; 1300; 1800) according to embodiment 90 or 91, comprising:

at least one processor (1850), and a memory (1860) containing program code executable by the at least one processor (1850), whereby execution of the program code by the at least one processor (1850) causes the wireless communication device (10; 1300; 1800) to perform a method according to any one of embodiments 1 to 48.

Embodiment 93

A wireless communication device (10; 1300; 1500; 1800), the wireless communication device (10; 1300; 1500; 1800) being configured to:

determine a Discontinuous Reception, DRX, configuration for D2D communication; align the DRX configuration with a further wireless communication device (10; 1300; 1500; 1800); and based on the DRX configuration, participate in D2D communication with the further wireless communication device (10; 1300; 1500; 1800).

Embodiment 94

The wireless communication device (10; 1300; 1500; 1800) according to embodiment 93, wherein the wireless communication device (10; 1300; 1500; 1800) is configured to perform a method according to any one of embodiments 50 to 75.

Embodiment 95

The wireless communication device (10; 1300; 1500; 1800) according to embodiment 93 or 94, comprising:

at least one processor (1850), and a memory (1860) containing program code executable by the at least one processor (1850), whereby execution of the program code by the at least one processor (1850) causes the wireless communication device (10; 1300; 1500; 1800) to perform a method according to any one of embodiments 49 to 75.

Embodiment 96

A node (100; 1700; 1900) for a wireless communication network, the node (100; 1700; 1900) being configured to:

align a first wireless communication device (10; 1300; 1500; 1800) and a second wireless communication device (10; 1300; 1500; 1800) with respect to a Discontinuous Reception, DRX, configuration for D2D communication between the first wireless communication device (10; 1300; 1500; 1800) and the second wireless communication device (10; 1300; 1500; 1800).

Embodiment 97

The node (100; 1700; 1900) according to embodiment 95, wherein the node (100; 1700; 1900) is configured to perform a method according to any one of embodiments 77 to 89.

Embodiment 98

The node (100; 1700; 1900) according to embodiment 95 or 96, comprising:

at least one processor (1950), and a memory (1960) containing program code executable by the at least one processor (1950), whereby execution of the program code by the at least one processor (1950) causes the node (100; 1700; 1900) to perform a method according to any one of embodiments 76 to 89.

Embodiment 99

A computer program or computer program product comprising program code to be executed by at least one processor of a wireless communication device (10; 1300; 1500; 1800), whereby execution of the program code causes the wireless communication device (10; 1300; 1500; 1800) to perform a method according to any one of embodiments 1 to 75.

Embodiment 100

A computer program or computer program product comprising program code to be executed by at least one processor of a node (100; 1700; 1900) for a wireless communication network, whereby execution of the program code causes the node (100; 1700; 1900) to perform a method according to any one of embodiments 76 to 89.

The invention claimed is:

1. A method of controlling device-to-device (D2D) communication, the method performed by a wireless communication device and comprising:

determining a Discontinuous Reception (DRX) configuration for D2D communication;

aligning the DRX configuration for D2D communication with a further wireless communication device, wherein aligning the DRX configuration comprises:

receiving configuration information from the further wireless communication device, wherein the received configuration information indicates one or more candidate DRX configurations for D2D communication;

based on the received configuration information, determining configuration information for at least a part of the DRX configuration for D2D communication;

indicating the determined configuration information to the further wireless communication device, and in response to said indicating the determined configuration information, receiving acknowledgement information indicating whether the determined configuration information is accepted, wherein the acknowledgement information also indicates an updated DRX configuration for D2D communication; and based on the aligned DRX configuration for D2D communication, participating in D2D communication with the further wireless communication device.

2. The method according to claim 1, wherein the determined configuration information is indicated by a D2D transmission to the further wireless communication device.

3. The method according to claim 2, wherein the determined configuration information is indicated by one or more of the following in the D2D transmission: radio resource control (RRC) information, medium access control (MAC) control information, and physical layer control information.

4. The method according to claim 1, wherein at least part of the configuration information is determined further based on one or more of the following:

a DRX configuration for downlink or uplink communication with a wireless communication network; and characteristics of D2D communication between the wireless communication device and the further wireless communication device.

5. The method according to claim 1, wherein the configuration information received from the further wireless communication device is received in a D2D transmission as one or more of the following: radio resource control (RRC) information; medium access control (MAC) control information, and physical layer control information.

6. The method according to claim 1, wherein the configuration information indicates at least part of the DRX configuration for D2D communication based on one of the following:

a deviation of one or more parameters of the DRX configuration from a DRX configuration for downlink or uplink communication with the wireless communication network; and identifying one among multiple pre-configured DRX configurations.

7. The method according to claim 1, wherein at least part of the DRX configuration for D2D communication is determined further based on one or more of the following:

a DRX configuration for downlink or uplink communication with the wireless communication network; and characteristics of D2D communication between the wireless communication device and the further wireless communication device.

8. The method according to claim 1, wherein the wireless communication device is a connected vehicle.

9. A non-transitory, computer-readable medium storing program code executable by one or more processors of a wireless communication device, wherein execution of the program code configures the wireless communication device to perform operations corresponding to the method according to claim 1.

10. A wireless communication device comprising:

a radio interface configured for at least device-to-device (D2D) communication;

one or more processors operably coupled to the radio interface; and a memory storing program code executable by the one or more processors, wherein execution of the program code configures the wireless communication device to:

determine a Discontinuous Reception (DRX) configuration for D2D communication;

align the DRX configuration for D2D communication with a further wireless communication device, including the following operations:

receive configuration information from the further wireless communication device, wherein the received configuration information indicates one or more candidate DRX configurations for D2D communication;

based on the received configuration information, determine configuration information for at least a part of the DRX configuration for D2D communication, indicate the determined configuration information to the further wireless communication device, and in response to indicating the determined configuration information, receive acknowledgement information indicating whether the determined configuration information is accepted, wherein the acknowledgement information also indicates an updated DRX configuration for D2D communication; and based on the aligned DRX configuration for D2D communication, participate in D2D communication with the further wireless communication device.

11. The wireless communication device according to claim 10, wherein the determined configuration information is indicated by a D2D transmission to the further wireless communication device.

12. The wireless communication device according to claim 11, wherein the determined configuration information is indicated by one or more of the following in the D2D transmission: radio resource control (RRC) information, medium access control (MAC) control information, and physical layer control information.

13. The wireless communication device according to claim 10, wherein execution of the program code configures the wireless communication device to determine at least part of the configuration information further based on one or more of the following:

a DRX configuration for downlink or uplink communication with a wireless communication network; and

characteristics of D2D communication between the wireless communication device and the further wireless communication device.

14. The wireless communication device according to claim 10, wherein the configuration information received from the further wireless communication device is received in a D2D transmission as one or more of the following: radio resource control (RRC) information; medium access control (MAC) control information, and physical layer control information.

15. The wireless communication device according to claim 10, wherein execution of the program code configures the wireless communication device to determine at least part of the DRX configuration for D2D communication further based on one or more of the following:

a DRX configuration for downlink or uplink communication with the wireless communication network; and characteristics of D2D communication between the wireless communication device and the further wireless communication device.

16. The wireless communication device according to claim 10, wherein the wireless communication device is a connected vehicle.

* * * * *